(12) United States Patent
Sugimoto et al.

(10) Patent No.: US 11,797,245 B2
(45) Date of Patent: Oct. 24, 2023

(54) MESSAGE PROVIDING DEVICE, MESSAGE PROVIDING METHOD, AND NON-TRANSITORY COMPUTER READABLE MEDIUM

(71) Applicant: FUJIFILM Business Innovation Corp., Tokyo (JP)

(72) Inventors: Hideaki Sugimoto, Kanagawa (JP); Shigeo Miyata, Kanagawa (JP); Hiroyuki Mitsuhashi, Kanagawa (JP); Yu Mishima, Kanagawa (JP); Nozomi Noguchi, Kanagawa (JP); Shiori Oikawa, Kanagawa (JP); Xiaojing Zhang, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 28 days.

(21) Appl. No.: 17/715,125

(22) Filed: Apr. 7, 2022

(65) Prior Publication Data
US 2022/0229613 A1 Jul. 21, 2022

Related U.S. Application Data

(63) Continuation of application No. 16/372,524, filed on Apr. 2, 2019, now Pat. No. 11,327,696.

(30) Foreign Application Priority Data

Apr. 13, 2018 (JP) .................. 2018-077919
Apr. 25, 2018 (JP) .................. 2018-084343

(51) Int. Cl.
*G06F 3/12* (2006.01)
*H04L 51/18* (2022.01)
(Continued)

(52) U.S. Cl.
CPC .......... *G06F 3/1253* (2013.01); *G06F 3/1204* (2013.01); *H04L 51/02* (2013.01); *H04L 51/18* (2013.01); *H04L 51/224* (2022.05)

(58) Field of Classification Search
CPC ... G06F 3/1253; G06F 3/1204; H04L 51/224; H04L 51/02; H04L 51/18
See application file for complete search history.

(56) References Cited

U.S. PATENT DOCUMENTS 9,325,651 B2 4/2016 Sakuta et al.
10,652,178 B2 * 5/2020 Takishima ............ G06F 3/1287
(Continued)

FOREIGN PATENT DOCUMENTS

JP 2014-164522 A 9/2014
JP 2015-197813 A 11/2015

*Primary Examiner* — Sargon N Nano
(74) *Attorney, Agent, or Firm* — Oliff PLC

(57) ABSTRACT

A message providing device includes: a reception unit that receives, for each user, a request for a registration of an association between (i) a software robot program operating on a message service for an exchange of messages among users and exchanging messages with the user and (ii) an external device; and a registration unit that provides a single user with plural software robot programs in each of which operation setting information of the software robot program is preset, and registers an external device in each of the plural software robot programs in association with each other according to the request from the user.

15 Claims, 31 Drawing Sheets

| GROUP | USER | DATA | TYPE | CONTENTS |
|---|---|---|---|---|
| X | A | 10/26 13:00:30 | Text | ......... |
| X | B | 10/26 13:00:45 | Text | ......... |
| X | C | 10/26 13:00:50 | Sticker | ID1234 |
| X | B | 10/26 13:03:20 | Text | ......... |

(51) Int. Cl.
*H04L 51/02* (2022.01)
*H04L 51/224* (2022.01)

(56) References Cited

U.S. PATENT DOCUMENTS

| | | |
|---|---|---|
| 2009/0187630 A1* | 7/2009 | Narayanaswami .. G06Q 10/107 709/206 |
| 2014/0164522 A1 | 6/2014 | Chaturvedi et al. |
| 2014/0244769 A1 | 8/2014 | Sakuta et al. |
| 2015/0116756 A1* | 4/2015 | Mori ................. H04N 1/00854 358/1.14 |
| 2017/0237692 A1 | 8/2017 | Sheth et al. |
| 2017/0324868 A1 | 11/2017 | Tamblyn et al. |
| 2018/0109526 A1* | 4/2018 | Fung ..................... H04L 9/3271 |
| 2018/0227251 A1* | 8/2018 | Takishima .............. H04L 51/04 |
| 2019/0018974 A1 | 1/2019 | Chae et al. |
| 2019/0073197 A1 | 3/2019 | Collins |
| 2019/0171845 A1* | 6/2019 | Dotan-Cohen ......... H04L 51/02 |
| 2019/0213003 A1 | 7/2019 | Burlitskiy et al. |
| 2019/0250864 A1 | 8/2019 | Sugai |
| 2019/0258431 A1 | 8/2019 | Yamamoto et al. |
| 2019/0369924 A1 | 12/2019 | Oka |
| 2020/0097221 A1* | 3/2020 | Matsumoto ........... H04L 51/216 |
| 2020/0099637 A1* | 3/2020 | Kurokawa ......... H04N 1/00875 |
| 2020/0099642 A1* | 3/2020 | Mishima ............... G06F 3/1257 |
| 2020/0099643 A1* | 3/2020 | Makino .................. H04L 51/18 |
| 2020/0234384 A1* | 7/2020 | Wu ..................... G06F 16/9535 |
| 2021/0124539 A1 | 4/2021 | Matysiak et al. |

\* cited by examiner

|  | USER | PRINTER | COLOR | SIZE | NUMBER OF COPIES |
|---|---|---|---|---|---|
| 001 | USER A | PRINTER A | COLOR | A4 | 1 |
| 002 | USER B | PRINTER B | BLACK-AND-WHITE | Letter | 2 |
| ... |  |  |  |  |  |

FIG. 9A
| CHATBOT | USER | PRINTER | INITIAL |
|---|---|---|---|
| CHATBOT A-1 | (no entry) | (no entry) | - |
| | (no entry) | (no entry) | - |
FIG. 9B
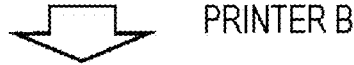
PRINTER B
| CHATBOT | USER | PRINTER | INITIAL |
|---|---|---|---|
| CHATBOT A-1 | USER A | PRINTER A | V |
| | (no entry) | (no entry) | - |
FIG. 9C
| CHATBOT | USER | PRINTER | INITIAL |
|---|---|---|---|
| CHATBOT A-1 | USER A | PRINTER A | V |
| | USER A | PRINTER B | - |

FIG. 12A
| CHATBOT | USER | PRINTER | INITIAL |
|---|---|---|---|
| CHATBOT A-1 | (no entry) | (no entry) | – |
| | (no entry) | (no entry) | – |
| CHATBOT A-2 | (no entry) | (no entry) | – |
| | (no entry) | (no entry) | – |
FIG. 12B
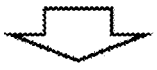
| CHATBOT | USER | PRINTER | INITIAL |
|---|---|---|---|
| CHATBOT A-1 | USER A | PRINTER A | ✓ |
| | (no entry) | (no entry) | – |
| CHATBOT A-2 | (no entry) | (no entry) | – |
| | (no entry) | (no entry) | – |
FIG. 12C
| CHATBOT | USER | PRINTER | INITIAL |
|---|---|---|---|
| CHATBOT A-1 | USER A | PRINTER A | ✓ |
| | (no entry) | (no entry) | – |
| CHATBOT A-2 | USER A | PRINTER A | ✓ |
| | (no entry) | (no entry) | – |

FIG. 17A

| CHATBOT | USER | DEVICE | INITIAL |
|---|---|---|---|
| CHATBOT A-1 | (no entry) | (no entry) | - |
| | (no entry) | (no entry) | - |
| CHATBOT A-2 | (no entry) | (no entry) | - |
| | (no entry) | (no entry) | - |

FIG. 17B 

| CHATBOT | USER | DEVICE | INITIAL |
|---|---|---|---|
| CHATBOT A-1 | USER A | MULTIFUNCTION MACHINE A | V |
| | (no entry) | (no entry) | - |
| CHATBOT A-2 | (no entry) | (no entry) | - |
| | (no entry) | (no entry) | - |

FIG. 17C 

| CHATBOT | USER | DEVICE | INITIAL |
|---|---|---|---|
| CHATBOT A-1 | USER A | MULTIFUNCTION MACHINE A | V |
| | (no entry) | (no entry) | - |
| CHATBOT A-2 | USER A | MULTIFUNCTION MACHINE A | V |
| | (no entry) | (no entry) | - |

FIG. 20A

| CHATBOT | USER | DEVICE | INITIAL |
|---|---|---|---|
| CHATBOT A-1 | USER A | PRINTER A | - |
| | USER A | MULTIFUNCTION MACHINE A | v |
| CHATBOT A-2 | USER A | MULTIFUNCTION MACHINE A | v |
| | (no entry) | (no entry) | - |

FIG. 20B

| CHATBOT | USER | DEVICE | INITIAL |
|---|---|---|---|
| CHATBOT A-1 | USER A | PRINTER A | v |
| | (no entry) | (no entry) | - |
| CHATBOT A-2 | USER A | MULTIFUNCTION MACHINE A | v |
| | (no entry) | (no entry) | - |

FIG. 20C

| CHATBOT | USER | DEVICE | INITIAL |
|---|---|---|---|
| CHATBOT A-1 | USER A | PRINTER A | v |
| | (no entry) | (no entry) | - |
| CHATBOT A-2 | (no entry) | (no entry) | - |
| | (no entry) | (no entry) | - |

| GROUP | USER | DATA | TYPE | CONTENTS |
|---|---|---|---|---|
| X | A | 10/26 13:00:30 | Text | ………. |
| X | B | 10/26 13:00:45 | Text | ………. |
| X | C | 10/26 13:00:50 | Sticker | ID1234 |
| X | B | 10/26 13:03:20 | Text | ………. |

MESSAGE PROVIDING DEVICE, MESSAGE PROVIDING METHOD, AND NON-TRANSITORY COMPUTER READABLE MEDIUM

CROSS-REFERENCE TO RELATED APPLICATIONS

This application is a continuation application of U.S. patent application Ser. No. 16/372,524 filed Apr. 2, 2019, and is based on and claims priority under 35 USC 119 from Japanese Patent Application No. 2018-084343 filed Apr. 25, 2018 and Japanese Patent Application No. 2018-077919 Apr. 13, 2018. The entire disclosures of these applications are incorporated by reference herein in their entireties.

BACKGROUND

(i) Technical Field

The present invention relates to a message providing device, a message providing method, and a non-transitory computer readable medium.

(ii) Related Art

JP-A-2014-164522 discloses a message notification device that notifies a message for reporting a result of an operation instruction from a user, by explicitly specifying a reception destination of the message. An operation instruction detection unit detects the operation instruction from a message, and specifies a member who wrote the message as an instructor. A reporting message display unit displays a message indicating a result of the operation performed according to the operation instruction, on a family message board in a state where the instructor is explicitly specified as the reception destination.

JP-A-2015-197813 discloses instructing copy or movement of an exchanged message or causing the message to be shared by another group, on a message communication service.

In a message service such as chatting or a social networking service (SNS) for an exchange of messages between users, there has been suggested a software robot program which operates on the message service and is designed (personified) for the purpose of simulating chatting with a human through voice or texts (hereinafter, referred to as a "chatbot"). The chatbot operates to detect a specific word or phrase from a message input from a user and output a prepared response which is suitable thereto. Since the chatbot may be operated by a messenger service account allocated for the advertising or commercial purpose, such as a company or a store, the user can enjoy the chatting with the chatbot through an exchange of natural messages and can cause the chatbot to execute various services.

Further, not only the exchange of messages between two users is possible, but also three or more users may constitute a group, and messages may be exchanged within the group (group chatting), so that plural users can enjoy the chatting and cause the chatbot to execute various services.

SUMMARY

However, it is complicated to register setting information on the operation of the software robot program (operation setting information) for each user in advance, when the user causes the software robot program to execute a desired service. When many items need to be registered as the operation setting information, the registering procedure are more complicated.

Aspects of non-limiting embodiments of the present disclosure relate to obviating the need for the procedure of registering the operation setting information in advance when using the software robot program.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a message providing device including: a reception unit that receives, for each user, a request for a registration of an association between (i) a software robot program operating on a message service for an exchange of messages among users and exchanging messages with the user and (ii) an external device; and a registration unit that provides a single user with plural software robot programs in each of which operation setting information of the software robot program is preset, and registers an external device in each of the plural software robot programs in association with each other according to the request from the user.

BRIEF DESCRIPTION OF THE DRAWINGS

Exemplary embodiment(s) of the present invention will be described in detail based on the following figures, wherein:

FIGS. 9A to 9C are explanatory views of an update of the setting information table according to Exemplary Embodiment 1;

FIGS. 12A to 12C are explanatory views of an update of a setting information table according to Exemplary Embodiment 2;

FIGS. 17A to 17C are explanatory views of an update of a setting information table according to Exemplary Embodiment 3;

FIGS. 20A to 20C are explanatory views of an update of a setting information table according to Exemplary Embodiment 4;

DETAILED DESCRIPTION

Exemplary embodiments of the present disclosure will be described based on an example with reference to the accompanying drawings. In the example, a chatbot provides a printing service in accordance with a message from a user.

Exemplary Embodiment 1

Figure 1:
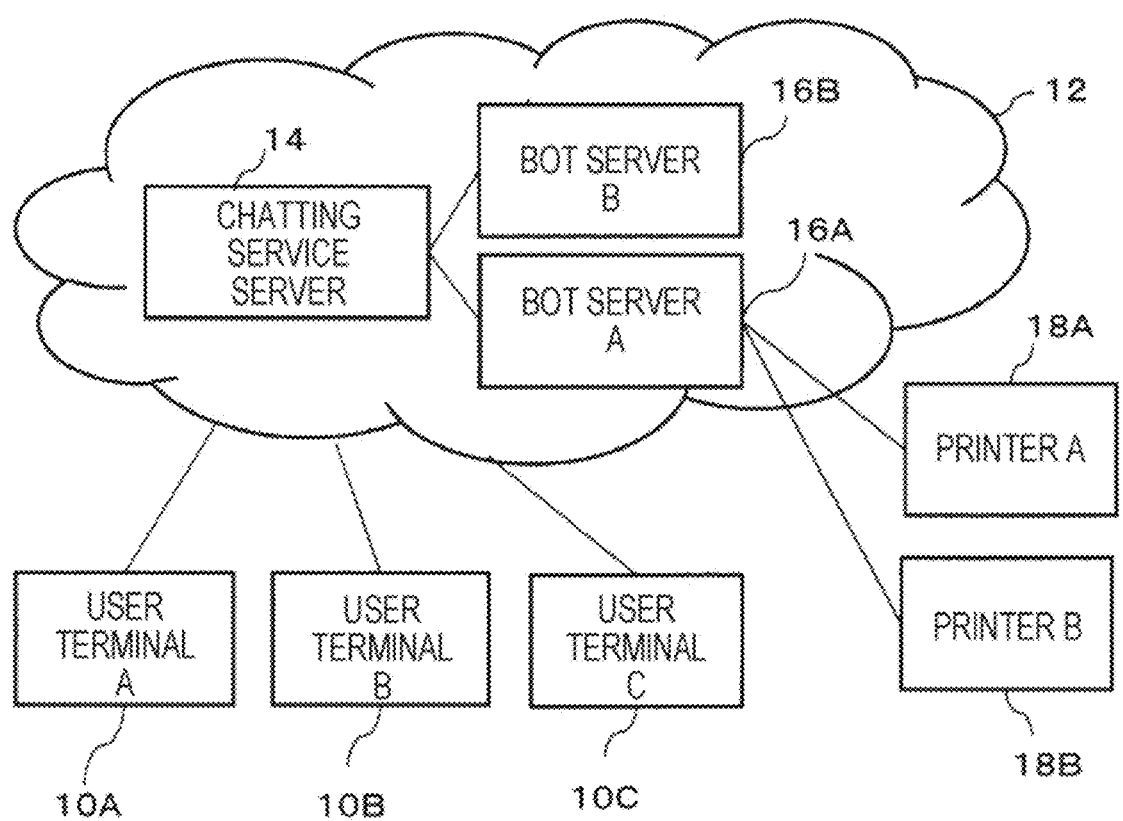
FIG. 1 is a system configuration diagram according to Exemplary Embodiment 1.

FIG. 1 illustrates an entire configuration diagram of a message service system according to an exemplary embodiment. The message service system includes a user terminal A (10A) to a user terminal C (10C), a chatting service server 14, a bot server A (16A) and a bot server B (16B), and a printer A (18A) and a printer B (18B).

The user terminal A (10A) to the user terminal C (10C) are terminals that are used by users of the message service, and are information terminals such as smartphones, tablet terminals, and personal computers (PCs). While FIG. 1 illustrates the three user terminals, that is, the user terminal A (10A), the user terminal B (10B), and the user terminal C (10C), the number of user terminals may be any number. The users operate the user terminal A (10A) to the user terminal C (10C) to access the chatting service server 14 on a clouding system 12 and exchange messages with another user or a chatbot. Hereinafter, it is assumed that the user A operates the user terminal A, the user B operates the user terminal B, and the user C operates the user terminal C. The user terminal A (10A) to the user terminal C (10C) and the chatting service server 14 are connected to each other to be able to transmit and receive data via a wired or wireless communication network. While an example of the communication network is a public line such as the Internet, the communication network may be a dedicated line.

The chatting service server 14 is a cloud server disposed on the clouding system 12 and provides a chatting service. The chatting service server 14 is configured with one or plural server computers. The chatting service server 14 executes overall processes related to the message exchange such as transmitting and receiving messages to and from the user terminal A to the user terminal C, and displaying the transmission and reception of messages on a display screen. In addition to processing the exchange of messages between two users, the chatting service server 14 may form a group with three or more users and process the exchange of messages within the group (group chatting). Further, the chatting service server 14 cooperates with the bot server A (16A) and the bot server B (16B) to process the exchange of messages with respect to the chatbots provided by the bot servers 16A and 16B. The exchange of messages between a user(s) and a chatbot includes an exchange of messages between one user and the chatbot and an exchange of messages between plural users and the chatbot.

Each of the bot server A (16A) and the bot server B (16B) functions as a message providing device. In the bot server A (16A) and the bot server B (16B), software robot programs of chatbots that exchange messages with the users are installed, and the bot servers execute their corresponding programs. Each of the bot server A (16A) and the bot server B (16B) may be operated by a messenger service account allocated for the advertising or commercial purpose, such as a company or a store.

The bot server A (16A) and the bot server B (16B) cooperate with the chatting service server 14 via a specific application programming interface (API), to exchange messages with the users and automatically respond to messages from the users. The specific API is an API for using the chatting service server 14. While the format of the API may be any format, the API may have, for example, a javascript object notation (JSON) format, in which JSON data in a prescribed format is transmitted to a specific URL of the chatting service server 14 by POST or GET, and the result is returned as data in the JSON format.

When a message from the user includes an operation instruction, the bot server A (16A) and the bot server B (16B) execute specific service contents according to the operation instruction. In the present exemplary embodiment, when a message from the user includes a printing instruction, the bot server A (16A) functions as a "printing bot" that operates a printer A (18A) or a printer B (18B) to perform the printing process according to the printing instruction. Meanwhile, the bot server 16B is capable of providing an arbitrary service according to the operation instruction from the user. While FIG. 1 illustrates the two bot servers, that is, the bot server A (16A) and the bot server B (18B), the number of the bot servers may be any number and may be one. In addition, plural chatbots may be constituted implemented by one bot server, or one chatbot may be implemented by plural bot servers.

The bot server A which is a chatbot (or printer bot) drives the printer A or B according to setting information on the operation of the software robot program (operation setting information) to perform the printing process. The setting information may be referred to as an operation condition for operating the printer A or the printer B.

The printer A (18A) and the printer B (18B) perform the printing process according to a command from the bot server A.

Figure 2:
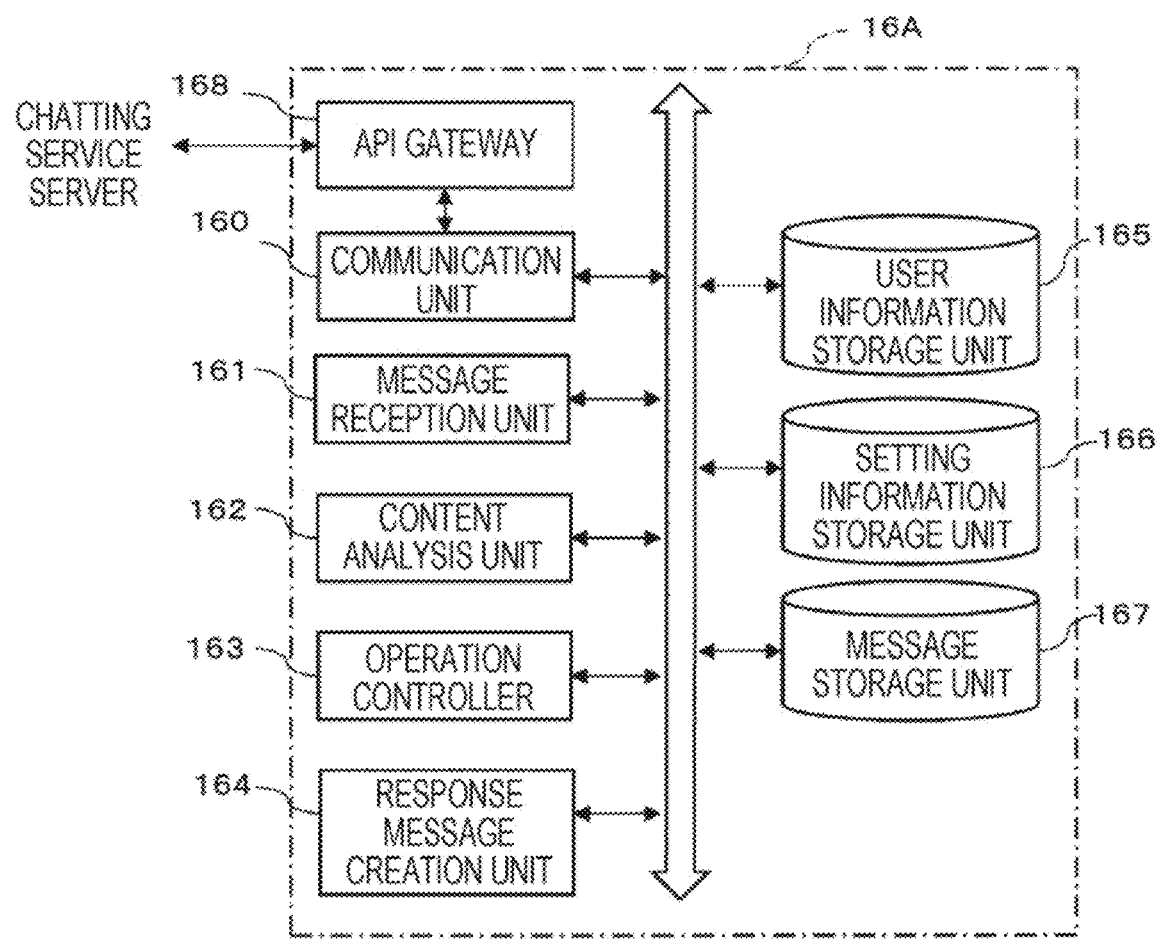
FIG. 2 is a functional block diagram according to Exemplary Embodiment 1.

FIG. 2 is a functional block diagram of the bot server A (16A) which is a message providing device. The bot server A includes a communication unit 160, a message reception unit 161, a content analysis unit 162, an operation controller 163, a response message creation unit 164, a user information storage unit 165, a setting information storage unit 166, a message storage unit 167, and an API gateway 168, as functional blocks.

The communication unit 160 communicates with the chatting service server 14 and the printers A and B. The communication unit 160 communicates with the chatting service server 14 via the API gateway 168 to exchange messages. The communication unit 160 outputs messages received from the chatting service server 14 via the API gateway 168, that is, messages from the user terminal A to the user terminal C, to the message reception unit 161. Further, the communication unit 160 transmits a response message created by the response message creation unit 164 to the chatting service server 14 (i.e., the user terminal A to the user terminal C) via the API gateway 168. Further, according to a command from the operation controller 163, the communication unit 160 outputs a printing command to the printer A and the printer B to drive the printers A and B.

The message reception unit 161 functions as a reception unit to receive a message from the communication unit 160 and to output the message to the content analysis unit 162. The message includes a message on a registration of setting information. The message reception unit 161 sequentially stores the received message in the message storage unit 167.

The content analysis unit 162 analyzes the contents of the received message and outputs the analysis result to the operation controller 163. Specifically, the content analysis unit 162 recognizes a user identifier (user ID) included in the received message, and extracts the text part included in the message to parse the text part. The parsing method is arbitrary, and for example, the input message is segmented into morpheme units, and nouns, adjectives, verbs, and interrogative pronouns are extracted as keywords. When the text part of the message includes an operation instruction, the content analysis unit 162 analyzes the contents of the operation instruction and outputs the analysis result to the operation controller 163. In the present exemplary embodiment, the operation instruction includes a request for a registration of the printers A and B as external devices or the printing instruction to the printers A and B.

The operation controller 163 functions as a registration unit to register the printers A and B as external devices in association with the users in the setting information storage unit 166 based on the analysis result obtained by the content analysis unit 162. Further, the operation controller 163 outputs a printing command to the printers A and B via the communication unit 160.

The response message creation unit 164 creates a response message according to the analysis result in the content analysis unit 162, and transmits the response message to the chatting service server 14 via the communication unit 160. Especially, the response message creation unit 164 creates the response message according to keywords such as "@printer" and "@multifunction machine" included in a message from the user.

The user information storage unit 165 stores information of the user who uses the chatting service server 14, in particular, information of the user who uses the chatbot implemented by the bot server A, as a table. The chatbot is allocated with a specific account on the chatting service implemented by the chatting service server 14, and when the user designates the account and performs a specific operation (e.g., an operation indicating a "friend" registration), the use of the chatbot is determined. The user information is, for example, a user ID. Information on authority of each user may be stored.

The setting information storage unit 166 stores the setting information (operation setting information) for each of plural chatbots implemented by the bot server A, as a table. The items of the setting information are, for example, a color mode, a paper size, the number of copies, and an image quality, but are not limited thereto. The setting information may be determined according to the contents of a service provided by the bot server A. For the printing service, the setting information is information on the printing. For a search service, the setting information is information on a search condition. The setting information is information for defining the contents of a service and may include plural items. When registering the printers A and B as external devices in association with the users in the setting information storage unit 166, the operation controller 163 compares the setting information (operation setting information) of each chatbot and the attributes of the external devices with each other. Here, the attribute of an external device refers to various functions of the external device, and indicates various functions of a printer when the external device is a printer.

The message storage unit 167 stores the messages that the message reception unit 161 receives from the user, as a history.

Figure 3:
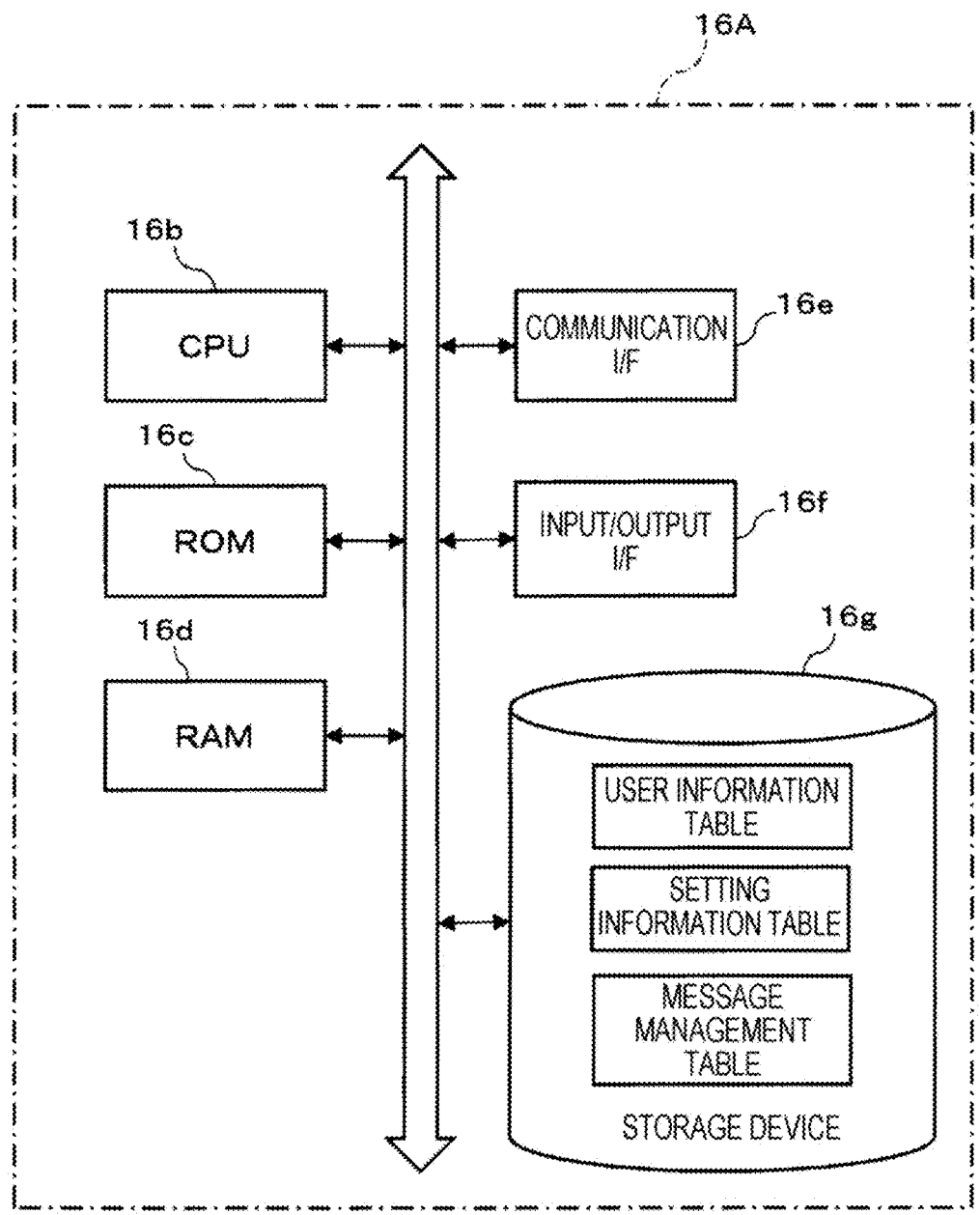
FIG. 3 is a configuration block diagram according to Exemplary Embodiment 1.

FIG. 3 illustrates a configuration block diagram of the bot server A. The bot server A is implemented by one or more server computers, and includes one or more CPUs 16b, a ROM 16c, a RAM 16d, a communication interface (I/F) 16e, an input/output I/F 16f, and a storage device 16g.

The one or more CPUs 16b implement the function of the chatbot by reading a bot application stored in the ROM 16c or the storage device 16g and using the RAM 16d as a working memory. That is, the CPU 16b automatically responds to a message from the user, and when the operation instruction is included in the message from the user, the CPU 16b drives the printer A or B according to an operation instruction. By executing the bot application, the CPU 16b implements the message reception unit 161, the content analysis unit 162, the operation controller 163, the response message creation unit 164, and the API gateway 168 in FIG. 2.

The communication I/F 16e exchanges messages with the chatting service server 14 and outputs a printing command to the printer A or B.

The input/output I/F 16*f* transmits/receives data with an input device such as a keyboard or a mouse and an output device such as a display device.

The storage device 16*g* is configured with a nonvolatile memory such as a hard disk drive (HDD) or a solid state drive (SSD), and stores a user information table, a setting information table, and a message management table, in addition to the bot application. The storage device 16*g* implements the user information storage unit 165, the setting information storage unit 166, and the message storage unit 167 in FIG. 2.

In the present exemplary embodiment, the CPU executes the software robot program for implementing the chatbot. However, part of the chatbot may be implemented by a hardware processing, rather than the processing by the execution of the program. The hardware processing may be performed using a circuit such as an ASIC or FPGA (field programmable gate array).

Hereinafter, the registration of the setting information (operation setting information) will be described by using a user A and a user B as examples.

Figures 4, 5:
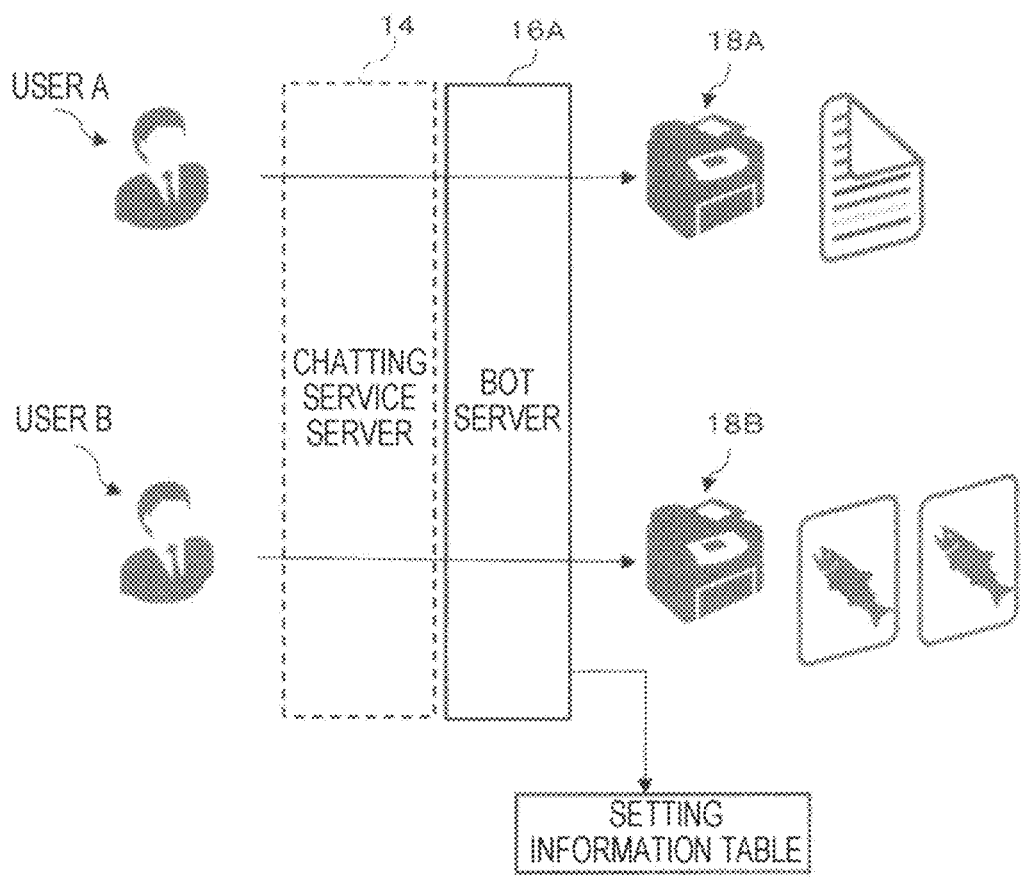
FIG. 4 is an explanatory view of a registration of setting information.
FIG. 5 is an explanatory view of a setting information table.

FIG. 4 schematically illustrates a general setting registration process by the user A and the user B.

When the user A and the user B perform a specific operation for acquiring an authority to use the chatbot allocated with a specific account on the chatting service ("friend registration"), the bot server A (16A) allocates a user identifier (user ID) to each of the user A and the user B, and also allocates a printer identifier (printer ID) to each of the printers A and B for uniquely identifying the printer A and the printer B. As for the user ID, the account of each of the user A and the user B on the chatting service may be used as it is.

Subsequently, the user A transmits a message to the bot server A (16A) via the chatting service server 14, specifies the printer A or the printer B, and then, registers the setting information. For example, the user A specifies the printer A, and then, transmits a message for designating:
 color mode: color,
 paper size: A4, and
 the number of copies: 1,
as the setting information. Upon receiving this message, the bot server A analyzes the contents of the message. When the bot server A interprets the message as the setting information, the bot server A associates the user A and the printer A with each other, and then, records the setting information in the setting information table.

The same applies to the user B. The user B transmits a message to the bot server A (16A) via the chatting service server 14, specifies the printer A or the printer B, and then, registers the setting information. For example, the user B specifies the printer B, and then, transmits a message for designating:
 color mode: black-and-white,
 paper size: letter, and
 the number of copies: 2,
as the setting information. Upon receiving this message, the bot server A analyzes the contents of the message. When the bot server A interprets the message as the setting information, the bot server A associates the user B and the printer B with each other, and then, records the setting information in the setting information table.

FIG. 5 illustrates an example of the setting information table stored in the setting information storage unit 166. For each user, a printer, color (color mode), size (paper size), and the number of copies are recorded in association with each other. More specifically, the identification information of each user is recorded in association with printer identification information, color (color mode), size (paper size), and the number of copies.

As described above, the user A and the user B need to register the setting information of the printers prior to causing the chatbot to execute the printing service, and thus, the registering procedure is complicated.

Accordingly, in the present exemplary embodiment, plural chatbots are provided in advance to one user such that the setting information (operation setting information) is set in advance (preset) for each of the plural chatbots. Then, the user performs an operation to associate a chatbot for which the presetting is completed, with a desired printer. As a result, the need for the registration of the setting information is obviated. The plural chatbots may be implemented by the single bot server A.

Figures 6, 7:
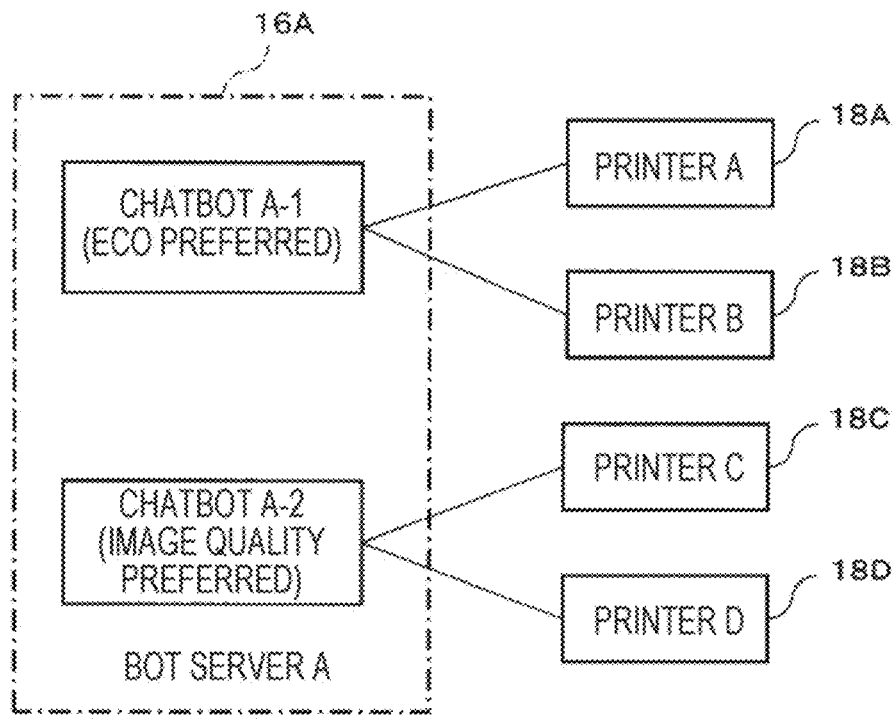
FIG. 6 is an explanatory view of a process according to Exemplary Embodiment 1.
FIG. 7 is an explanatory view of a registration of setting information according to Exemplary Embodiment 1.

FIG. 6 schematically illustrates the process according to the present exemplary embodiment. Two chatbots, that is, a chatbot A-1 and a chat bot A-2 are implemented by the bot server A. For the chatbot A-1, "eco preferred" is set in advance (preset) as first operation setting information. For the chatbot A-2, "image quality preferred" is set in advance (preset) as second operation setting information. Here, the "eco preferred" is a setting by which energy can be saved and specifically corresponds to, for example, the following setting:
 color mode: monochrome (black-and-white),
 double-sided setting: double sided,
 the number of copies: 1,
 N-up designation: 2-up, and
 image quality mode: standard.
The N-up designation indicates collectively printing data of plural (N) pages on one page, and 2-up indicates collectively printing data of two pages on one page. In addition, the "image quality preferred" is a setting for preferring the image quality of the printing and specifically corresponds to, for example, the following setting:
 color mode: color,
 double-sided setting: single sided,
 the number of copies: 1,
 N-up designation: 1-up, and
 image quality mode: high image quality.
These pieces of setting information are registered in advance in the setting information storage unit 166 for each chatbot. The registration may be performed by the administrator of the chatbot.

Then, the user registers one or more external devices, specifically, printers for each of the plural chatbots. For example, the user A registers the printer A and the printer B in the chatbot A-1 preset with "eco preferred," and registers a printer C and a printer D in the chatbot A-2 preset with "image quality preferred."

When it is desired to perform the eco preferred printing, the user A transmits a message of the printing instruction to the chatbot A-1 set with "eco preferred." Meanwhile, when it is desired to perform the image quality preferred printing, the user A transmits a message of the printing instruction to the chatbot A-2 set with "image quality preferred." According to the printing instruction from the user A, the chatbot A-1 drives one of the printer A and the printer B registered for the user A, for example, a printer set as a default, to perform the eco preferred printing. In addition, according to the printing instruction from the user A, the chatbot A-2 also drives one of the printer C and the printer D registered for the user A, for example, a printer set as a default, to perform the image quality preferred printing. The user A can print with a desired condition by simply registering the printers for each chatbot without registering the setting information.

FIG. 7 illustrates an example of the setting information table according to the present exemplary embodiment. Plural chatbots (two chatbots in FIG. 7) exist, and the printers are registered in association with the users for each chatbot. For example, in the chatbot A-1, the printer A and the printer B are registered in association with the user A, and the printer A is set as a default printer (initial printer). The printer B is registered in association with the user B and set as default printer.

In addition, in the chatbot A-2, the printer A is registered in association with the user A and set as a default printer. The printer B is registered in association with the user B and set as default printer.

When the user A transmits a message of the printing instruction to the chatbot A-1, the chatbot A-1 specifies the printer A which is the default printer associated with the user A according to the setting information table illustrated in FIG. 7, and performs the printing service with the eco preferred setting, that is, the following setting:
 color mode: monochrome (black-and-white),
 double-sided setting: double sided,
 the number of copies: 1,
 N-up designation: 2-up, and
 image quality mode: standard.
In addition, when the user A transmits a message of the printing instruction to the chatbot A-2, the chatbot A-2 specifies the printer A which is the default printer associated with the user A according to the setting information table, and performs the printing service with the image quality preferred setting, that is, the following setting:
 color mode: color,
 double-sided setting: single sided,
 the number of copies: 1,
 N-up designation: 1-up, and
 image quality mode: high image quality.
The user A can print with a desired condition by separately using the chatbots A-1 and A-2 without registering the respective items of the setting information such as the color mode, double-sided setting, N-up designation, and image quality mode.

Likewise, when the user B transmits a message of the printing instruction to the chatbot A-1, the chatbot A-1 specifies the printer B which is the default printer associated with the user B according to the setting information table illustrated in FIG. 7, and performs the printing service with the eco preferred setting, that is, the following setting:
 color mode: monochrome (black-and-white),
 double-sided setting: double sides,
 the number of copies: 1,
 N-up designation: 2-up, and
 image quality mode: standard.
In addition, when the user B transmits a message of the printing instruction to the chatbot A-2, the chatbot A-2 specifies the printer B which is the default printer associated with the user B according to the setting information table, and performs the printing service with the image quality preferred setting, that is, the following setting:
 color mode: color,
 double-sided setting: single sided,
 the number of copies: 1,
 N-up designation: 1-up, and
 image quality mode: high image quality.
While FIG. 7 illustrates the two chatbots A-1 and A-2, three or more chatbots may be provided for one user. For example, in addition to the chatbots A-1 and A-2, a chatbot A-3 may be provided for the user A, such that in addition to the eco preferred printing and the image quality preferred printing, a normal printing may be prepared.

Figure 8:
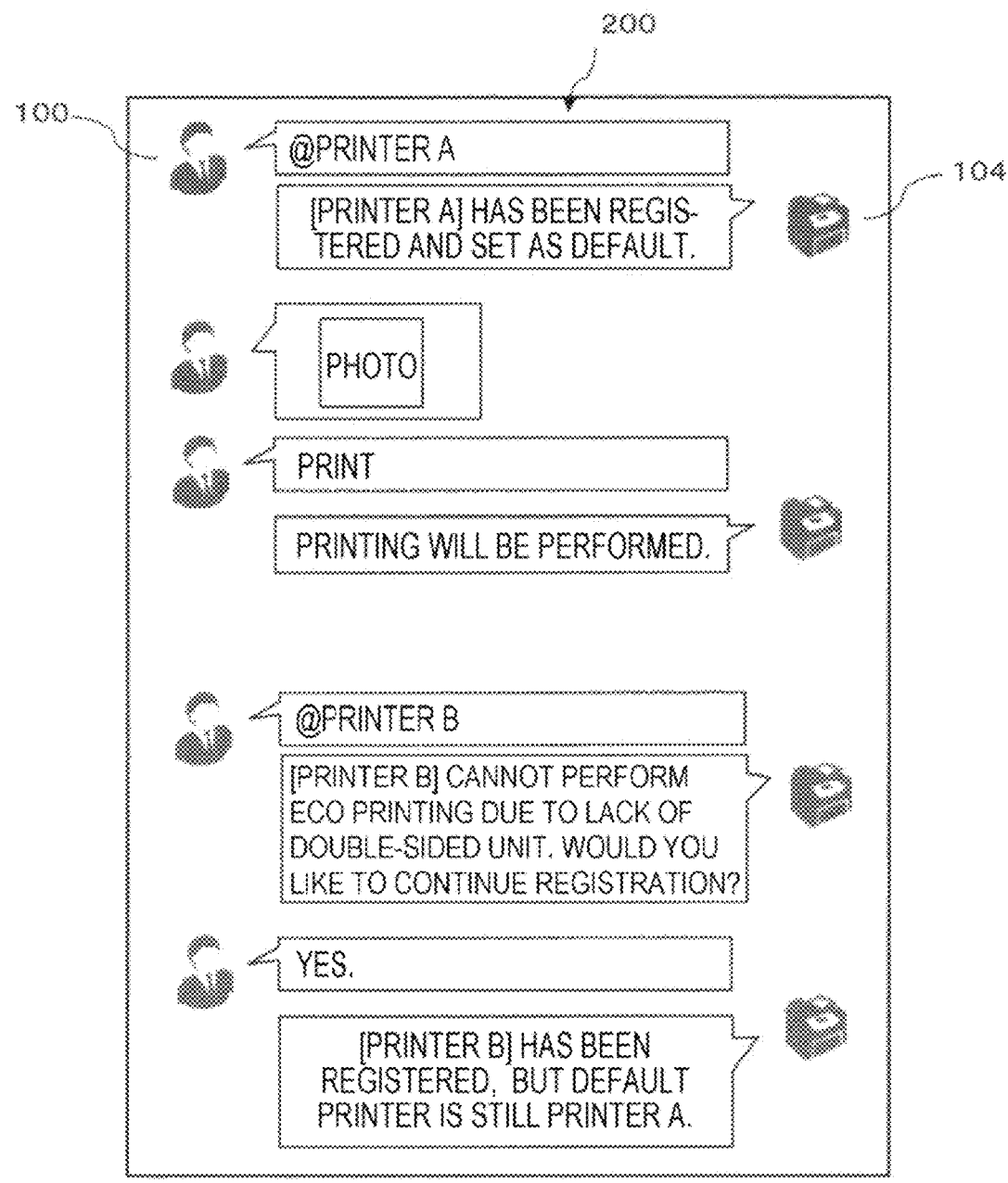
FIG. 8 is an explanatory view of display of a screen of a user terminal according to Exemplary Embodiment 1.

The setting information of the normal printing may be as follows:
 double-sided setting: single sided,
 the number of copies: 1,
 N-up designation: 1-up, and
 image quality mode: standard.
FIG. 8 illustrates an example of a screen displayed on the user terminal A (10A) operated by the user A. It is assumed that there exist the chatbot A-1 with the eco preferred setting and the chatbot A-2 with the image quality preferred setting as chatbots, and no printer has been registered in the chatbots. Further, it is assumed that the user A is able to use the chatbot A-1 ("registered as a friend"). The chatting service server 14 displays, on the screen of the user terminal A, a visual representation figure (icon) 100 representing the user A, and an icon 104 representing the chatbot A-1 implemented by the bot server A. Messages 200 of the user A and the chatbot A-1 are sequentially displayed from top to bottom.

In FIG. 8, first, the user A operates the user terminal A to transmit a message "@Printer A" to the chatbot A-1.

This message is a message for requesting the registration of the printer A. The chatbot A-1 analyzes the message, registers the user A and the printer A in association with each other in the setting information table, sets the printer A as a default printer, and then, creates and transmits a message "The printer A has been registered and set as a default" in response.

Subsequently, the user A operates the user terminal A to transmit a photo as image data to be printed. Subsequent to the transmission of the photo, the user A transmits a message "Print."

Upon receiving the photo and the message, the chatbot A-1 analyzes the contents of the message and performs the service for printing the transmitted photo. That is, by referring to the setting information table, the chatbot A-1 specifies the printer A associated with the user A, and outputs the printing data to the printer A. The printing condition is the setting information and corresponds to "eco preferred" preset for the chatbot A-1. Specifically, the setting information of the chatbot A-1 may be stored in advance in the storage device 16g.

Subsequently, the user A operates the user terminal A to transmit a message "@Printer B" to the chatbot A-1.

This message is a message for requesting the registration of the printer B. The chatbot A-1 analyzes the message and registers the user A and the printer B in association with each other in the setting information table. However, as for the attribute of the printer B, in a case where the printer B is not provided with a double-sided unit necessary for the double-sided printing, the printer B is incapable of performing the printing for "eco preferred" set for the chatbot A-1, and thus, does not conform to the setting information. Accordingly, the chatbot A-1 compares its own setting information (eco preferred) and the attribute of the printer B with each other, and when the attribute of the printer B does not conform to the setting information, the chatbot A-1 creates a message to that effect for a confirmation from the user A. For example, by creating and transmitting a message "The printer B cannot perform the eco printing due to lack of the double-sided unit. Would you like to continue the registration?" in response, the chatbot A-1 notifies that the attribute of the printer B does not conform to the setting information.

Upon viewing the message, the user A transmits, for example, a message "Yes." Upon receiving the positive reply from the user A, the chatbot A-1 registers the user A and the printer B in association with each other in the setting information table according to the message. When registering the plural printers in association with the user A, the chatbot A-1 sets any one of the printers as a default printer. The rule for setting the default printer is arbitrary and includes, for example, (1) setting a printer registered relatively earlier as a default, (2) setting a printer registered relatively later as a default, (3) inquiring of the user and setting a default according to a reply from the user, and (4) setting a printer conforming to the setting information as a default. When the rule (4) is adopted, the printer A conforms to the setting information (eco preferred), whereas the printer B does not conform to the setting information. Thus, the chatbot A-1 sets the printer A as a default printer, and creates and transmits a message "The printer B has been registered, but the default printer is still the printer A," in response. In this case, when the user A transmits a message for requesting the printing service at a later time, the printer A performs the printing service unless the printer B is specifically designated.

Meanwhile, when the user A views the message "The printer B cannot perform the eco printing due to lack of the double-sided unit. Would you like to continue the registration?" and transmits a message "No," the chatbot A-1 stops the registration of the printer B according to the negative reply from the user A.

In FIG. 8, the chatbot A-1 compares its own setting information (eco preferred) and the attribute of the printer B with each other, and when the attribute of the printer B does not conform to the setting information, the chatbot A-1 creates a message to that effect for a confirmation from the user A. However, in a case where the attribute of the printer B does not conform to the setting information, the chatbot A-1 may consistently refuse the registration. In this case, the chatbot A-1 creates and transmits a message "Because of lack of the double-sided unit, the printer B cannot perform the eco printing and cannot be registered," in response.

In addition, in FIG. 8, the printer A is set as a default printer. However, thereafter, when the printer B is mounted with the double-sided unit, and thus, conforms to the eco preferred setting information, the rule (2) may be adopted, and the chatbot A-1 may create and transmit a message for confirming from the user A whether to set the printer B as a default printer, in response.

FIGS. 9A to 9C illustrate an update of the setting information table in the process illustrated in FIG. 8.

FIG. 9A represents the initial state, and no printer has been registered in the chatbot A-1.

FIG. 9B represents the setting information table after the printer A is registered according to the message from the user A. The user A and the printer A are registered in association with each other, and the printer A is set as a default printer.

FIG. 9C represents the setting information table after the printer B is additionally registered according to the message from the user A. The user A and the printers A and B are registered in association with each other, and the printer A is set as a default printer.

Figure 10:
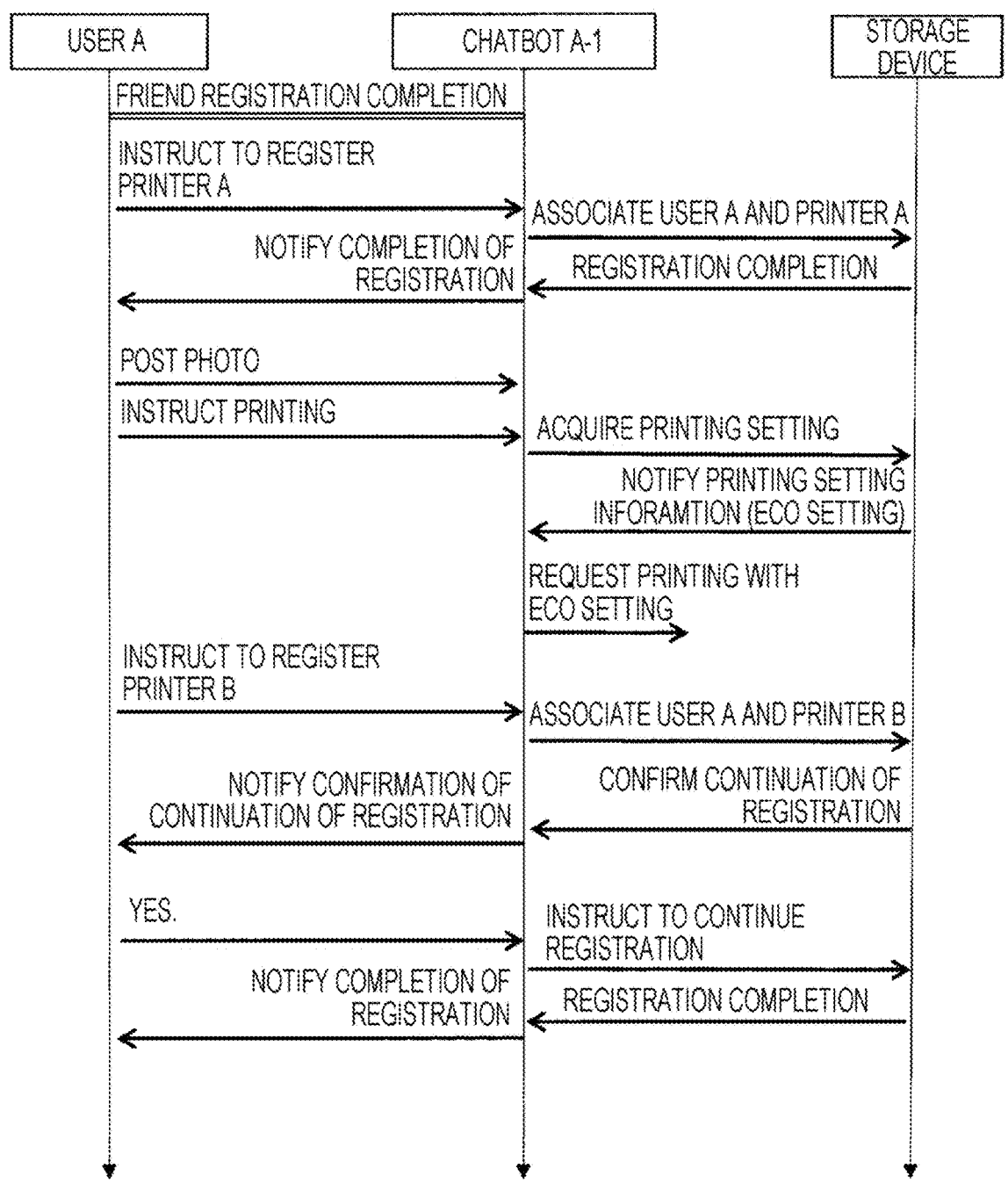
FIG. 10 is a sequence diagram of Exemplary Embodiment 1.

FIG. 10 illustrates a sequence diagram of the process illustrated in FIG. 8.

First, the user A operates the user terminal A to register the chatbot A-1 as a friend. Specifically, the user A designates the account of the chatbot A-1, and operates a specific button to acquire the authority to use the chatbot A-1. The chatbot A-1 registers the information of the user A in the user information table.

Subsequently, the user A operates the user terminal A to instruct the chatbot A-1 to register the printer A.

According to the registration instruction from the user A, the chatbot A-1 registers the user A and the printer A in association with each other in the setting information table of the storage device 16g. Specifically, when the message from the user A corresponds to the registration instruction according to the analysis result in the content analysis unit 162, the operation controller 163 registers the user A and the printer A in association with each other in the setting information table. At this time, the operation controller 163 compares the attribute of the printer A and the setting information (eco preferred) with each other, to determine whether the attribute of the printer A conforms to the setting information, and may register the printer A only when the attribute of the printer A conforms to the setting information. The attribute of the printer A may be acquired by a communication between the operation controller 163 and the printer A. As described above, the eco preferred setting information is as follows:

color mode: monochrome (black-and-white),
double-sided setting: double sided,
number of copies: 1,
N-up designation: 2-up, and
image quality mode: standard.

When the printer A is capable of implementing all of the functions above, the printer A conforms to the setting information, and when the printer A is incapable of implementing any one of the functions, the printer A does not conform to the setting information. For example, when the printer A is incapable of performing the double-sided printing, the printer A does not conform to the setting information. The printer A does not conform to the setting information either when the printer A is incapable of implementing the 2-up designation. When the registration in the setting information table is performed, the storage device 16g notifies the chatbot A-1 of the completion of the registration, and the chatbot A-1 creates and transmits a message for notifying the user A of the completion of the registration in response.

Upon viewing the message for notifying the completion of the registration, the user A operates the user terminal A to transmit (post) a photo and a message of the printing instruction. Upon receiving the photo and the message, the chatbot A-1 transmits a request for acquiring the printing setting to the storage device 16g. The printing setting corresponds to the setting information (eco preferred) of the chatbot A-1 preset in the storage device 16g, and the storage device 16g transfers the eco preferred setting information. The chatbot A-1 instructs the printer A to perform the eco preferred printing, that is, as follows.

color mode: monochrome (black-and-white),
double-sided setting: double sided,
the number of copies: 1,
N-up designation: 2-up, and
image quality mode: standard.

Subsequently, the user A operates the user terminal A to instruct the chatbot A-1 to register the printer B.

According to the registration instruction from the user A, the chatbot A-1 registers the user A and the printer B in association with each other in the setting information table of the storage device 16g. At this time, the chatbot A-1 compares the attribute of the printer B and the setting information (eco preferred) with each other, to determine whether the attribute of the printer B conforms to the setting information, and may register the printer B only when the attribute of the printer B conforms to the setting information. When the attribute of the printer B does not conform to the setting information, the storage device 16g notifies the chatbot A-1 of a confirmation as to whether to continue the registration of the printer B. According to the notification, the chatbot A-1 creates a message "The printer B cannot perform the eco printing due to lack of the double-sided unit. Would you like to continue the registration?" and transmits the message to the user for confirmation.

When the user A views the message and transmits a message "Yes," the chatbot A-1 instructs the storage device 16g to continue the registration. When the registration in the setting information table is performed according to the instruction to continue the registration, the storage device 16g notifies the chatbot A-1 of the completion of the registration, and the chatbot A-1 creates and transmits a message for notifying the user A of the completion of the registration in response.

By the processes above, the user A and the printers A and B are registered in association with each other in the setting information table. The user A has only to instruct the registration of the printers A and B, and does not need to register the detailed setting information for each printer.

Exemplary Embodiment 2

Figure 11A:
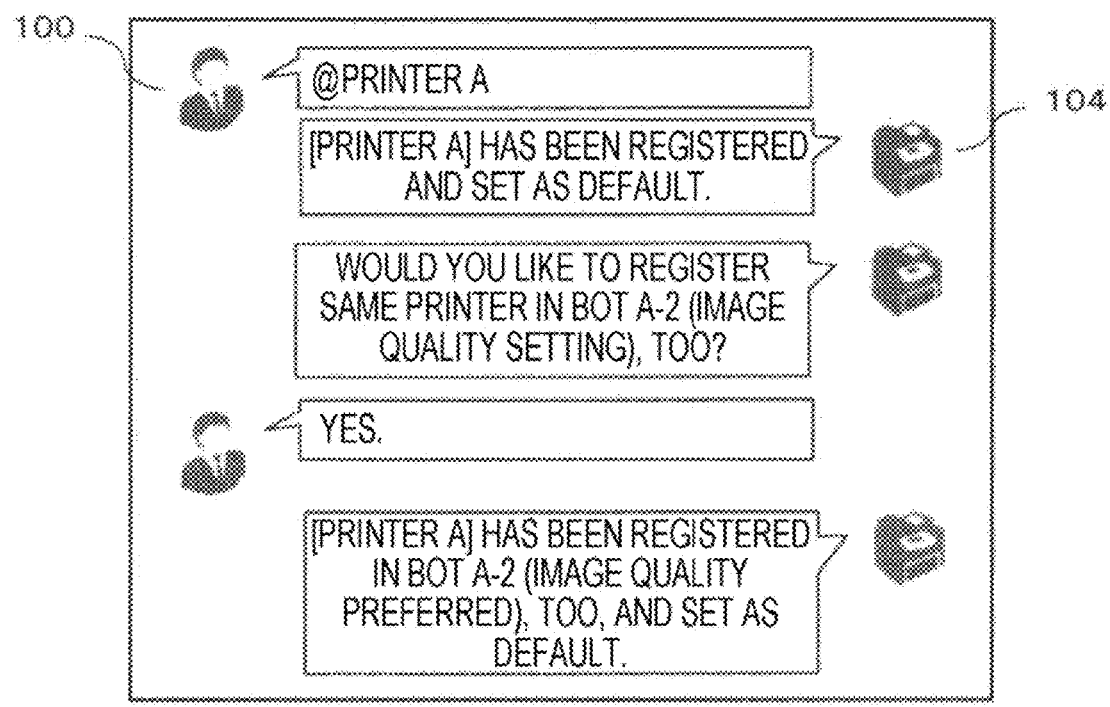
FIG. 11A is an explanatory view (part 1) of display of a screen of a user terminal according to Exemplary Embodiment 2.
Figure 11B:
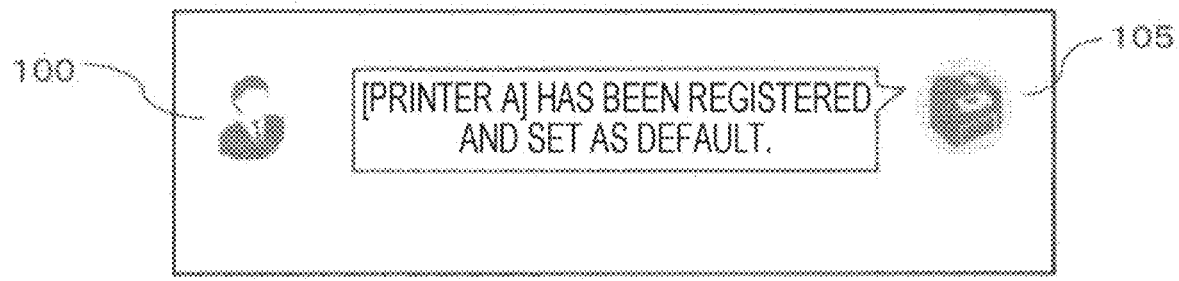
FIG. 11B is an explanatory view (part 2) of the display of the screen of the user terminal according to Exemplary Embodiment 2.

FIGS. 11A and 11B illustrate an example of the screen displayed on the user terminal A according to the present exemplary embodiment. It is assumed that there exist the chatbot A-1 with the eco preferred setting and the chatbot A-2 with the image quality preferred setting as chatbots, and no printer has been registered in the chatbots. Further, it is assumed that the user A is able to use the chatbots A-1 and A-2 ("registered as friends").

In FIG. 11A, first, the user A operates the user terminal A to transmit a message "@Printer A" to the chatbot A-1.

This message is a message for requesting the registration of the printer A. The chatbot A-1 analyzes the message, registers the user A and the printer A in association with each other in the setting information table, sets the printer A as a default printer, and then, creates and transmits a message "The printer A has been registered and set as a default" in response.

Subsequently, since there exists another chatbot A-2, the chatbot A-1 creates and transmits a message "Would you like to register the same printer in the chatbot A-2 (image quality preferred), too?"

When the user A views the message and transmits a message "Yes" by operating the user terminal A, the chatbot A-1 analyzes the message and registers the user A and the printer A in association with each other for the chatbot A-2 as well according to the positive reply. Then, the chatbot A-1 sets the printer A as a default printer in the chatbot A-2 as well, and creates and transmits a message "The printer A has been registered in the chatbot A-2 (image quality preferred), too, and set as a default printer," in response.

FIG. 11B is an example of the screen displayed on the user terminal A and represents a screen for chatting with the chatbot A-2. The screen displays an icon 105 of the chatbot A-2, in place of the icon of the chatbot A-1.

As illustrated in FIG. 11A, the chatbot A-1 registers the user A and the printer A in association with each other in the setting information table for the chatbot A-2. The chatbot A-2 refers to the setting information table, and since the user A and the printer A are registered in association with each other, the chatbot A-2 creates and transmits a message "The printer A has been registered and set as a default."

Upon viewing the message, the user A can reliably confirm that the printer A has been registered for the chatbot A-2.

FIGS. 12A to 12C illustrate an update of the setting information table in the process illustrated in FIG. 11A.

FIG. 12A represents the initial state, and no printer has been registered in the chatbots A-1 and A-2.

FIG. 12B represents the setting information table after the printer A is registered according to the message from the user A. For the chatbot A-1, the user A and the printer A are registered in association with each other, and the printer A is set as a default printer.

FIG. 12C represents the setting information table after the printer A is additionally registered for the chatbot A-2. The user A and the printer A are registered in association with each other, and the printer A is set as a default printer.

Figure 13:
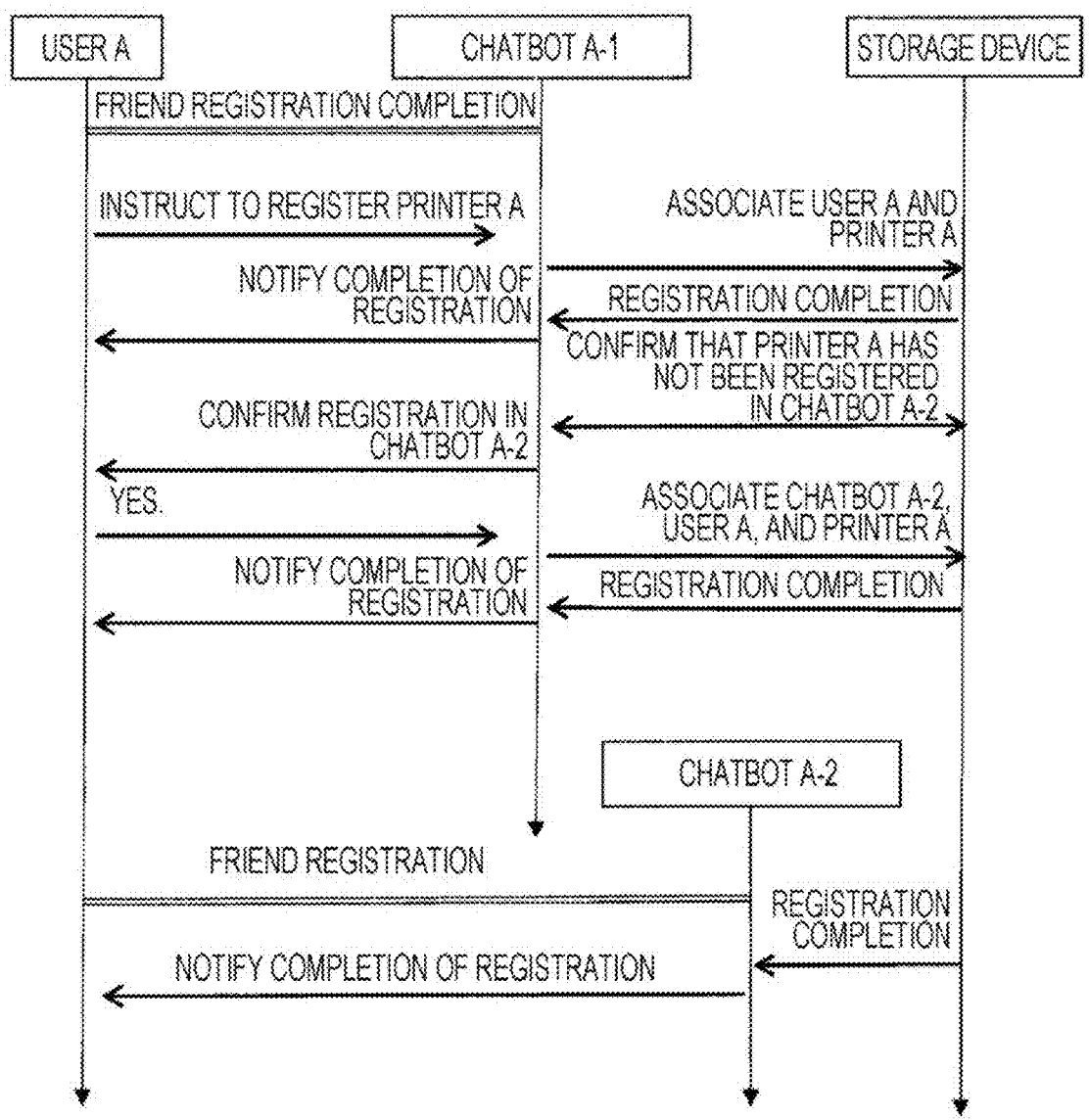
FIG. 13 is a sequence diagram of Exemplary Embodiment 2.

FIG. 13 illustrates a sequence diagram of the process illustrated in FIG. 11A.

First, the user A operates the user terminal A to register the chatbot A-1 as a friend. Specifically, the user A designates the account of the chatbot A-1, and operates a specific button to acquire the authority to use the chatbot A-1. The chatbot A-1 registers the information of the user A in the user information table.

Subsequently, the user A operates the user terminal A to instruct the chatbot A-1 to register the printer A.

According to the registration instruction from the user A, the chatbot A-1 registers the user A and the printer A in association with each other in the setting information table of the storage device 16g. At this time, the chatbot A-1 compares the attribute of the printer A and the setting information (eco preferred) with each other, to determine whether the attribute of the printer A conforms to the setting information, and may register the printer A only when the attribute of the printer A conforms to the setting information. When the registration in the setting information table is performed, the storage device 16g notifies the chatbot A-1 of the completion of the registration, and the chatbot A-1 creates and transmits a message for notifying the user A of the completion of the registration in response.

Subsequently, when the chatbot A-1 refers to the setting information table of the storage device 16g and confirms that no printer has been registered in the chatbot A-2, the chatbot A-1 creates and transmits a message for confirming the registration of the printer A for the chatbot A-2 to the user A.

When the user A views the message and transmits a message "Yes" by operating the user terminal A, the chatbot A-1 registers the user A and the printer A in association with each other in the setting information table of the storage device 16g for the chatbot A-2. At this time, the chatbot A-1 compares the attribute of the printer A and the setting information (image quality preferred) with each other to determine whether the attribute of the printer A conforms to the setting information, and may register the printer A only when the attribute of the printer A conforms to the setting information. When the registration in the setting information table is performed, the storage device 16g notifies the chatbot A-1 of the completion of the registration, and the chatbot A-1 creates and transmits a message for notifying the user A of the completion of the registration in response.

Meanwhile, the user A operates the user terminal A to register the chatbot A-2 as a friend. Specifically, the user A designates the account of the chatbot A-2, and operates a specific button to acquire the authority to use the chatbot A-2. The chatbot A-2 registers the information of the user A in the user information table.

When the chatbot A-2 refers to the setting information table of the storage device 16g and confirms that the user A and the printer A are registered in association with each other, the chatbot A-2 creates a message to that effect and transmits the message to the user A.

Exemplary Embodiment 3

In Exemplary Embodiments 1 and 2, the chatbots A-1 and A-2 provide the same type of service, that is, the printing service. However, the chatbots A-1 and A-2 may provide different types of services, rather than the same type of service.

Figures 14, 15:
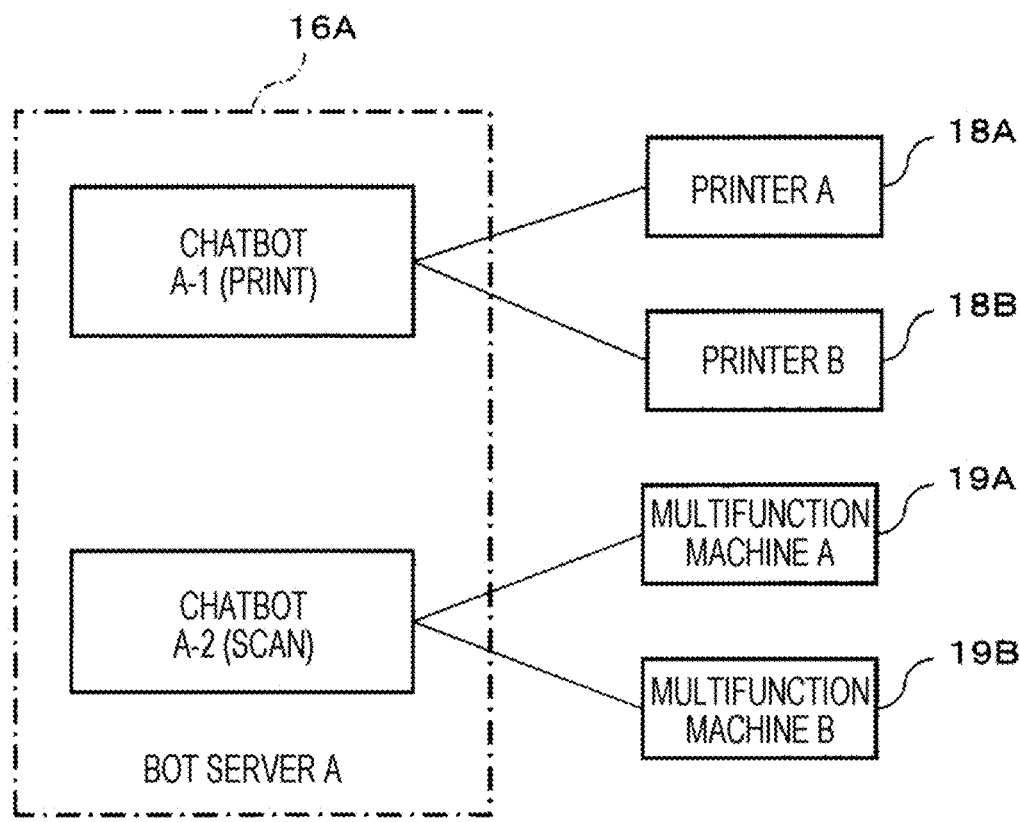
FIG. 14 is an explanatory view of a process according to Exemplary Embodiment 3.
FIG. 15 is an explanatory view of a registration of setting information according to Exemplary Embodiment 3.

FIG. 14 schematically illustrates the process according to the present exemplary embodiment. The two chatbots A-1 and A-2 are implemented by the bot server A. The chatbot A-1 performs the printing service, and the chatbot A-2 performs a scanning service which is different from the printing service.

The user registers one or plural external devices for each chatbot. For example, the user A registers the printers A and B in the chatbot A-1 preset for the printing service, and registers multifunction machines A and B in the chatbot A-2 preset for the scanning service. Here, the multifunction machine is a device having plural functions such as scanning, printing, copying, and faxing.

When it is desired to perform the printing, the user A transmits the printing instruction to the chatbot A-1 set for the printing service, and meanwhile, when it is desired to perform the scanning, the user A transmits a scanning instruction to the chatbot A-2 set for the scanning service. According to the printing instruction from the user A, the chatbot A-1 drives one of the printers A and B registered for the user A, for example, a printer set as a default, to perform the printing. The printing condition is preset as setting information, and for example, the eco preferred printing in Exemplary Embodiment 1 is performed. In addition, according to the scanning instruction from the user A, the chatbot A-2 drives one of the multifunction machines A and B registered for the user A, for example, a multifunction machine set as a default, to perform the scanning. The scanning condition is preset as setting information. The user A may receive the desired service by simply registering external devices for each chatbot without registering the setting information.

FIG. 15 illustrates an example of the setting information table according to the present exemplary embodiment. For each of the chatbots A-1 and A-2, the users, external devices, and a default (initial value) are registered in association with each other. For example, in the chatbot A-1, the user A, the printer A. and the multifunction machine A are registered in association with each other, and the printer A is set as a default. Further, the user B and the printer B are registered in association with each other, and the printer B is set as a default. In the chatbot A-2, the user A and the multifunction machine A are registered in association with each other, and the multifunction machine A is registered as a default. Further, the user B and the multifunction machine B are registered in association with each other, and the multifunction machine B is set as a default. In the chatbot A-1, the setting information for the printing service is set, and a printer and a multifunction machine may be registered as external devices. In this case, the printing service is performed using the printing function of the multifunction machine. In the chatbot A-2, the setting information for the scanning service is set, and a scanner or a multifunction machine may be registered as an external device. In this case, the scanning service is performed using the scanning function of the multifunction machine.

Figure 16A:
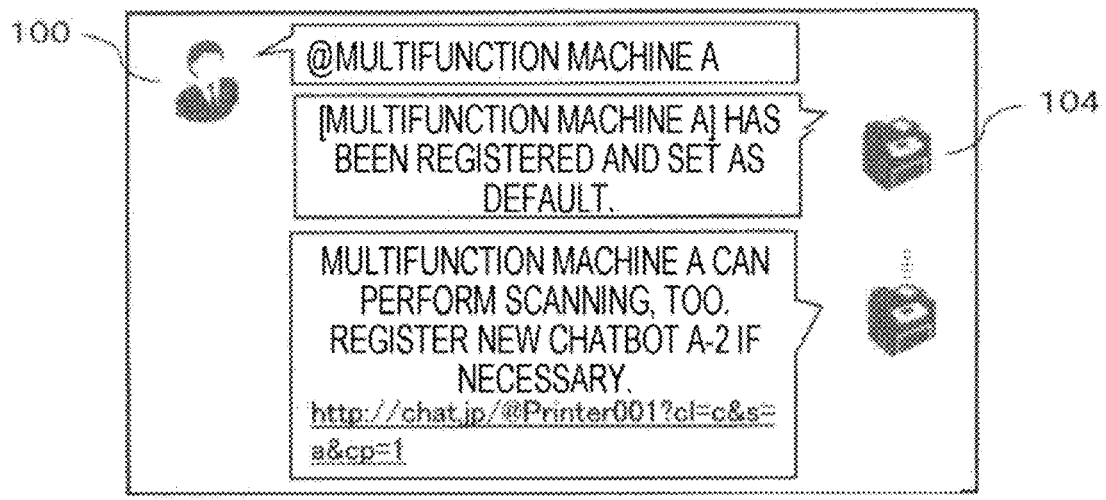
FIG. 16A is an explanatory view (part 1) of display of a screen of a user terminal according to Exemplary Embodiment 3.
Figure 16B:
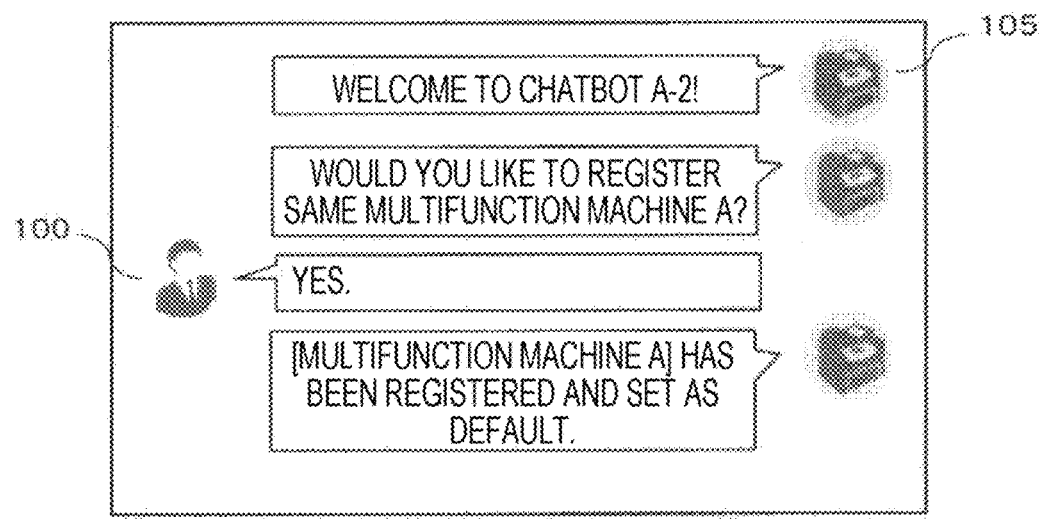
FIG. 16B is an explanatory view (part 2) of the display of the screen of the user terminal according to Exemplary Embodiment 3.

FIGS. 16A and 16B illustrate an example of the screen displayed on the user terminal A according to the present exemplary embodiment. It is assumed that there exist the chatbot A-1 for the printing service and the chatbot A-2 for the scanning service as chatbots, and no external device has been registered in the chatbots. Further, it is assumed that the user A is able to use the chatbots A-1 and A-2 ("registered as friends").

In FIG. 16A, first, the user A operates the user terminal A to transmit a message "@Multifunction machine A" to the chatbot A-1.

This message is a message for requesting the registration of the multifunction machine A. The chatbot A-1 analyzes the message, registers the user A and the multifunction machine A in association with each other in the setting information table, sets the multifunction machine A as a default, and then, creates and transmits a message "The multifunction machine A has been registered and set as a default," in response.

Subsequently, the chatbot A-1 determines the attribute of the multifunction machine A, and considering that the multifunction machine A has the scanning function, the chatbot A-1 creates and transmits a message "The multifunction machine A can perform the scanning, too. Register new chatbot A-2 if necessary."

Upon viewing the message, the user A shifts the current screen to the screen of FIG. 16B in order to register the multifunction machine A while chatting with the chatbot A-2.

FIG. 16B is an example of the screen displayed on the user terminal A and represents a screen for chatting with the chatbot A-2. The screen displays an icon 105 of the chatbot A-2, in place of the icon of the chatbot A-1.

The chatbot A-2 creates and transmits messages "Welcome to chatbot A-2!" and "Would you like to register the same multifunction machine A?"

Upon viewing the message, the user A transmits a message "Yes." According to the positive reply from the user A, the chatbot A-2 registers the user A and the multifunction machine A in association with each other in the setting information table. Then, the chatbot A-2 sets the multifunction machine A as a default, and creates and transmits a message "The multifunction machine A has been registered and set as a default," in response.

FIGS. 17A to 17C illustrate an update of the setting information table in the process illustrated in FIGS. 16A and 16B.

FIG. 17A represents the initial state, and no external device has been registered in the chatbots A-1 and A-2.

FIG. 17B represents the setting information table after the multifunction machine A is registered according to the message from the user A. For the chatbot A-1, the user A and the multifunction machine A are registered in association with each other, and the multifunction machine A is set as a default device.

FIG. 17C represents the setting information table after the multifunction machine A is additionally registered for the chatbot A-2. The user A and the multifunction machine A are registered in association with each other, and the multifunction machine A is set as a default device.

Figure 18:
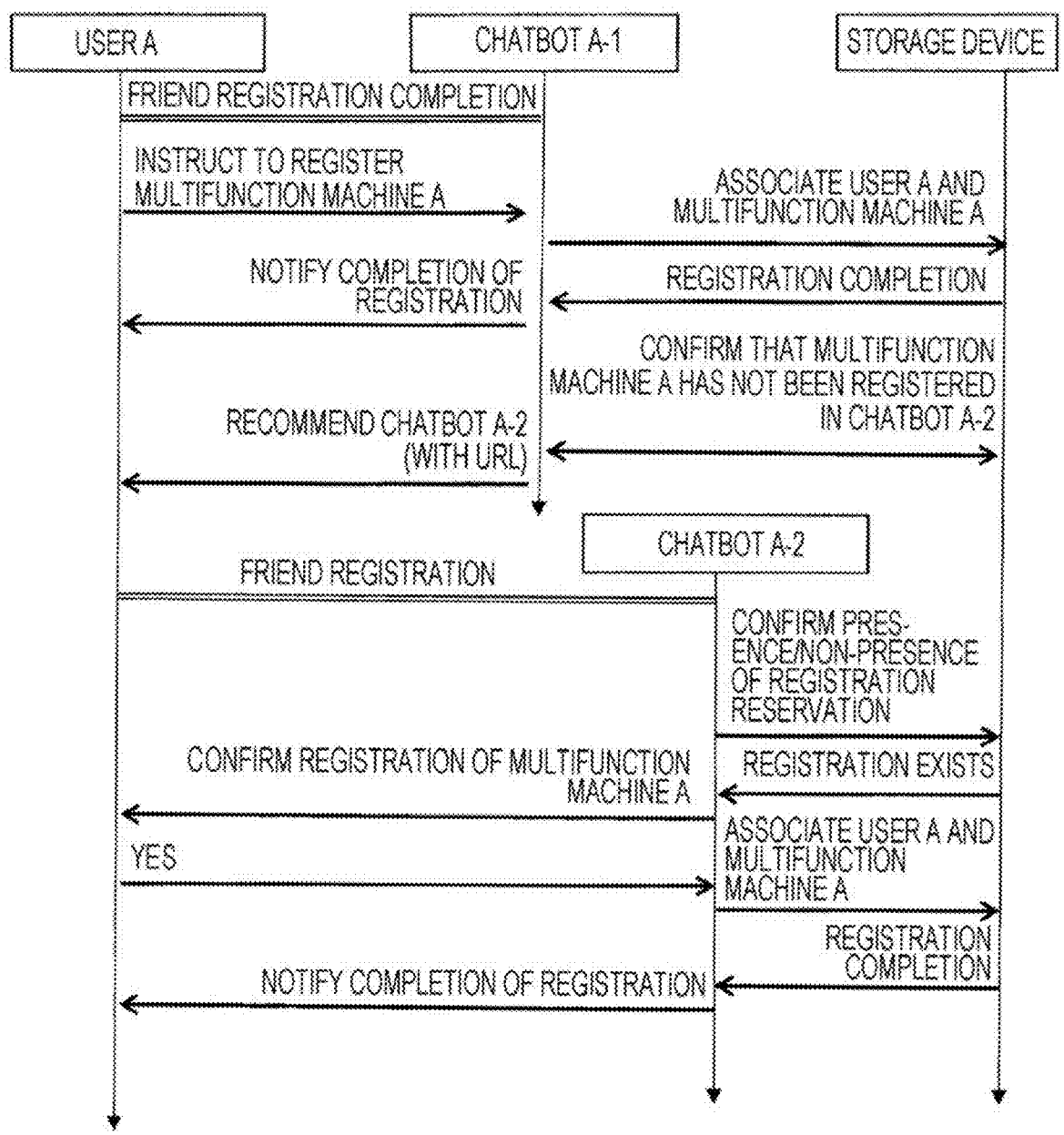
FIG. 18 is a sequence diagram of Exemplary Embodiment 3.

FIG. 18 illustrates a sequence diagram of the process illustrated in FIGS. 16A and 16B.

First, the user A operates the user terminal A to register the chatbot A-1 as a friend. Specifically, the user A designates the account of the chatbot A-1, and operates a specific button to acquire the authority to use the chatbot A-1. The chatbot A-1 registers the information of the user A in the user information table.

Subsequently, the user A operates the user terminal A to instruct the chatbot A-1 to register the multifunction machine A.

According to the registration instruction from the user A, the chatbot A-1 registers the user A and the multifunction machine A in association with each other in the setting information table of the storage device 16g. At this time, the chatbot A-1 compares the attribute of the multifunction machine A and the setting information (printing service) with each other to determine whether the attribute of the multifunction machine A conforms to the setting information, and may register the multifunction machine A only when the attribute of the multifunction machine A conforms to the setting information. When the registration in the setting information table is performed, the storage device 16g notifies the chatbot A-1 of the completion of the registration, and the chatbot A-1 creates and transmits a message for notifying the user A of the completion of the registration in response.

Subsequently, the chatbot A-1 refers to the setting information table of the storage device 16g and confirms that no external device has been registered in the chatbot A-2. Further, when the chatbot A-1 determines that the attribute of the multifunction machine A may conform to the setting information (scanning service) of the chatbot A-2, the chatbot A-1 creates and transmits a message for recommending the user A to register the multifunction machine A in the chatbot A-2. At this time, the account of the chatbot A-2, for example, the URL may be transmitted simultaneously. Further, the chatbot A-1 sets a registration reservation flag of the user A and the multifunction machine A for the reservation of the registration in the chatbot A-2, in the setting information table of the storage device 16g.

Upon viewing the message, the user A operates the user terminal A to register the chatbot A-2 as a friend. The chatbot A-2 registers the information of the user A in the user information table. Then, the chatbot A-2 refers to the setting information table of the storage device 16g, to determine whether the registration reservation flag is set. When there exists the registration reservation flag of the user A and the multifunction machine A, the chatbot A-2 creates a message for confirming the registration of the multifunction machine A and transmits the message to the user A according to the existence of the registration reservation flag.

When the user A views the message and transmits a message "Yes" by operating the user terminal A, the chatbot A-2 registers the user A and the multifunction machine A in association with each other in the setting information table of the storage device 16g. In addition, the registration reservation flag may be temporarily registered, and the association between the user A and the multifunction machine A may be actually registered according to the positive reply from the user A. When the registration in the setting information table is performed, the storage device 16g notifies the chatbot A-2 of the completion of the registration, and the chatbot A-2 creates and transmits a message for notifying the user A of the completion of the registration in response.

In addition, with reference to the setting information table of the storage device 16g, when an external device has already been registered in the chatbot A-2 or the attribute of the multifunction machine A does not conform to the setting information (scanning service) of the chatbot A-2, the chatbot A-1 does not need to transmit the message for recommending the user A to register the multifunction machine A in the chatbot A-2. For example, when the user A requests the registration of the multifunction machine A, the attribute of the multifunction machine A does not conform to the setting information (scanning service) of the chatbot A-2, and thus, the chatbot A-1 does not transmit a message for recommending the user A to register the multifunction machine A in the chatbot A-2. Even when an external device has already been registered in the chatbot A-2, the chatbot A-1 may transmit a message for recommending the user A to register the multifunction machine A in the chatbot A-2 as long as the attribute of the multifunction machine A conforms to the setting information (scanning service) of the chatbot A-2.

In addition, in the present exemplary embodiment, the chatbot A-1 recommends the registration of an external device in the chatbot A-2. However, in contrast, the chatbot A-2 may recommend the registration of an external device in the chatbot A-1. For example, when the multifunction machine B has not been registered in the chatbot A-1, and the user A requests the registration of the multifunction machine B to the chatbot A-2, the chatbot A-2 recommends the registration of the multifunction machine B in the chatbot A-1 based on the confirmation that the multifunction machine B has not been registered in the chatbot A-1, and the attribute of the multifunction machine B conforms to the setting information (printing service) of the chatbot A-1.

Exemplary Embodiment 4

In Exemplary Embodiments 1 to 3, a case where an external device is registered in the chatbot has been described. However, in the present exemplary embodiment, a case where an external device registered in the chatbot is deleted will be described.

Figure 19A:
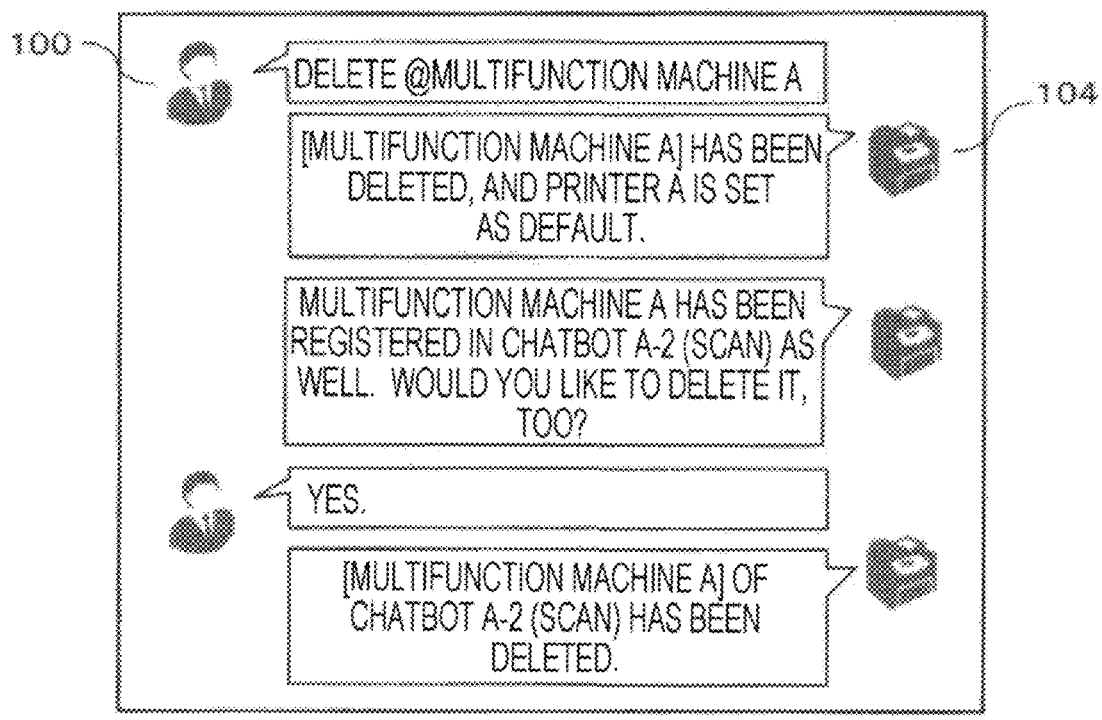
FIG. 19A is an explanatory view (part 1) of display of a screen of a user terminal according to Exemplary Embodiment 4.
Figure 19B:
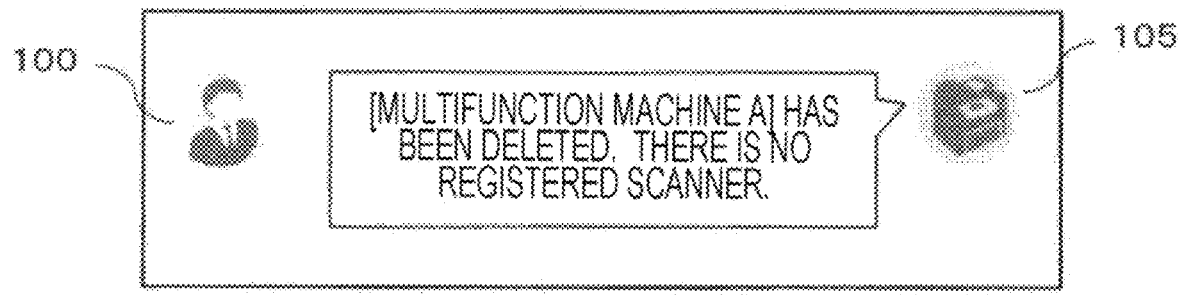
FIG. 19B is an explanatory view (part 2) of the display of the screen of the user terminal according to Exemplary Embodiment 4.

FIGS. 19A and 19B illustrate an example of the screen displayed on the user terminal A according to the present exemplary embodiment. It is assumed that the user A registers the printer A and the multifunction machine A in the chatbot A-1 preset for the printing service, and registers the multifunction machine A in the chatbot A-2 preset for the scanning service.

In FIG. 19A, first, the user A operates the user terminal A to transmit a message "Delete @Multifunction machine A."

The chatbot A-1 analyzes the message, refers to the setting information table, and deletes the multifunction machine A registered in association with the user A from the setting information table. Then, the chatbot A-1 sets the printer A which is the remaining external device registered in association with the user A, as a default, and creates and transmits a message "The multifunction machine A has been deleted, and the printer A is set as a default," in response.

Subsequently, the chatbot A-1 refers to the setting information table again to determine whether the same multifunction machine A has been registered in association with the user A for the chatbot A-2. When the multifunction machine A has also been registered in association with the user A for the chatbot A-2, the chatbot A-1 creates and transmits a message "The multifunction machine A has been registered in the chatbot A-2 as well. Would you like to delete it, too?"

When the user A views the message and transmits a message "Yes," the chatbot A-1 refers to the setting information table and deletes the multifunction machine A registered in association with the user A for the chatbot A-2 from the setting information table, according to the positive reply from the user A.

In addition, when the user A transmits a message "No" in response to the message "The multifunction machine A has been registered in the chatbot A-2 as well. Would you like to delete it, too?," the chatbot A-1 keeps the registration of the multifunction machine A in association with the user A for the chatbot A-2 according to the negative message from the user A.

FIG. 19B is an example of the screen displayed on the user terminal A and represents a screen for chatting with the chatbot A-2. The screen displays an icon 105 of the chatbot A-2, in place of the icon of the chatbot A-1.

When the multifunction machine A associated with the user A is deleted by the chatbot A-1 from the setting information table, the chatbot A-2 creates and transmits a message "The multifunction machine A has been deleted. There is no registered scanner."

By viewing this message, the user A can confirm that the multifunction machine A registered in the chatbot A-2 has been deleted.

In the present exemplary embodiment, a case where the chatbots A-1 and A-2 exist in different chatting rooms has been described. However, in a case where the chatbots A-1 and A-2 exist in the same chatting room, the chatbot A-2 may be caused to automatically leave the chatting room at the time when the registration of the multifunction machine A for the chatbot A-2 is deleted, and thus, there exists no external device that has been registered for the chatbot A-2. This is because the chatbot A-2 is incapable of performing the scanning service unless the external device exists.

FIGS. 20A to 20C illustrate an update of the setting information table in the process illustrated in FIGS. 19A and 19B.

FIG. 20A represents the initial state. For the chatbot A-1, the printer A and the multifunction machine A are registered in association with the user A, and the multifunction machine A is set as a default device. Further, for the chatbot A-2, the multifunction machine A is registered in association with the user A, and the multifunction machine A is set as a default device.

FIG. 20B represents the setting information table after the multifunction machine A for the chatbot A-1 is deleted according to the message from the user A. For the chatbot A-1, the multifunction machine A associated with the user A is deleted, and instead of the multifunction machine A, the printer A is set as a default device.

FIG. 20C also represents the setting information table after the multifunction machine A for the chatbot A-2 is deleted. Since the multifunction machine A for the chatbot A-2 has been deleted, the chatbot A-2 is in a state where no external device has been registered.

Figure 21:
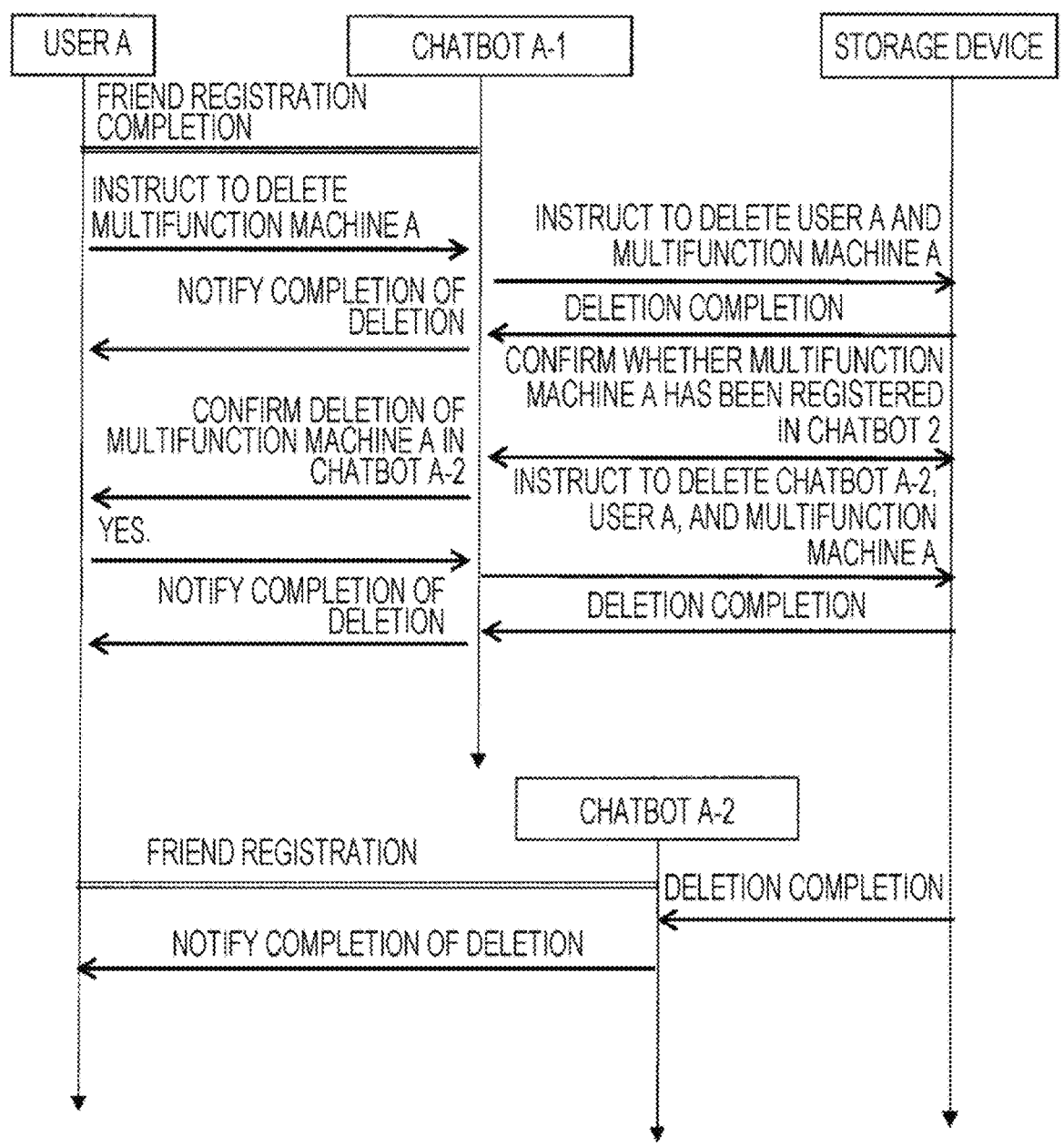
FIG. 21 is a sequence diagram of Exemplary Embodiment 4.

FIG. 21 illustrates a sequence diagram of the process illustrated in FIGS. 19A and 19B.

The user A operates the user terminal A to request the deletion of the multifunction machine A to the chatbot A-1.

The chatbot A-1 instructs the storage device 16*g* to delete the multifunction machine A, and the storage device 16*g* deletes the multifunction machine A registered in the setting information table in association with the user A. When the deletion of the multifunction machine A is completed, the storage device 16*g* notifies the chatbot A-1 of the completion of the deletion, and according to the notification, the chatbot A-1 creates and transmits a message for notifying the user A of the completion of the deletion in response.

Subsequently, the chatbot A-1 determines whether the multifunction machine A has been registered for the chatbot A-2. When the multifunction machine A has been registered, the chatbot A-1 creates and transmits a message for confirming from the user A whether to delete the multifunction machine A registered for the chatbot A-2.

When the user A transmits a positive message in response to the message above, the chatbot A-1 instructs the storage device 16*g* to delete the multifunction machine A registered in association with the user A for the chatbot A-2. According to the instruction, the storage device 16*g* deletes the multifunction machine A registered in the setting information table in association with the user A. When the deletion of the multifunction machine A is completed, the storage device 16*g* notifies the chatbot A-1 of the completion of the deletion, and according to the notification, the chatbot A-1 creates and transmits a message for notifying the user A of the completion of the deletion in response.

Meanwhile, when the deletion of the multifunction machine A is completed, the chatbot A-2 creates a message indicating the completion of the deletion of the multifunction machine A, and transmits the message to the user A.

As described above, in a case where the same external device has been registered for both the chatbots A-1 and A-2, when the external device is deleted from the chatbot A-1, the external device for the chatbot A-2 is also deleted in conjunction with the deletion of the external device from the chatbot A-1.

While Exemplary Embodiments 1 to 3 have been described, the invention is not limited to the exemplary embodiments and may be modified in various ways. Hereinafter, modifications of Exemplary Embodiments 1 to 3 will be described.

<Modification 1>

In Exemplary Embodiments 1 to 3, as an example of the chatbot, the chatbot provides the printing service or the scanning service according to a message from the user. However, the chatbot may provide any other services. Examples of the services are as follows.

Search service for music, news articles, accommodations, books, cooking recipes, etc.

Ticket reservation service

Service for item selling/search/contact for transaction at a flea market

Service for translation into other languages

Figure 22:
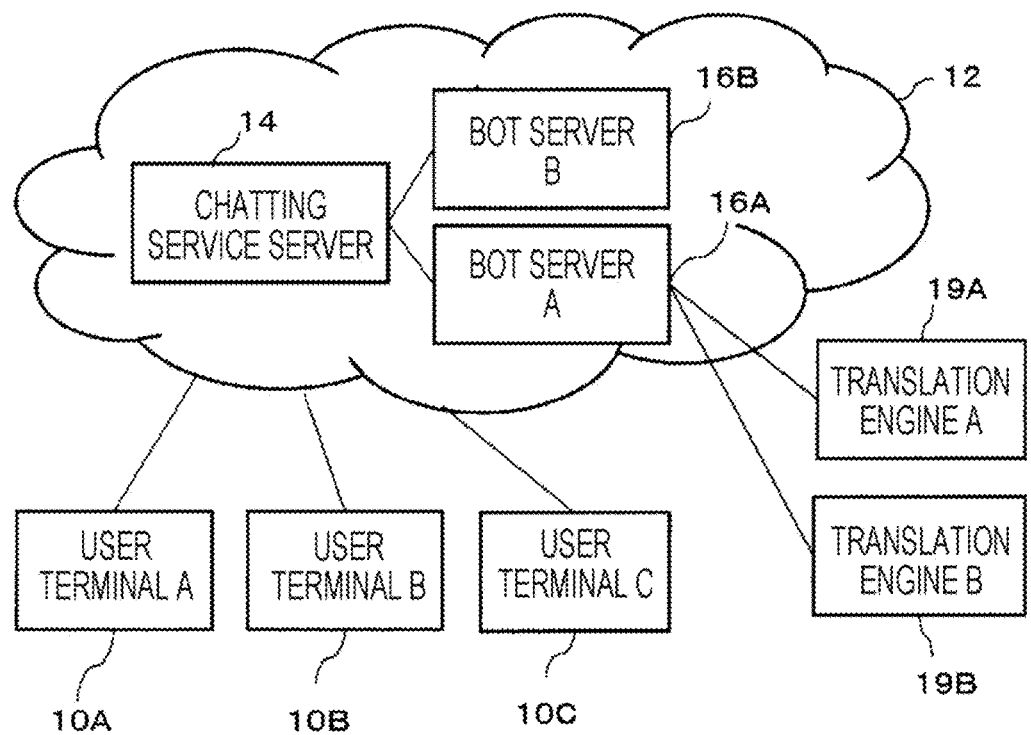
FIG. 22 is a system configuration diagram according to a modification.

FIG. 22 illustrates a system configuration diagram in a case where the translation service is performed. Unlike FIG. 1, instead of the printer A (18A) and the printer B (18B), a translation engine A (19A) and a translation engine B (19B) are provided.

The bot server A implements plural, for example, two chatbots A-1 and A-2, such that setting information for translating Japanese into English is preset for the chatbot A-1, and setting information for translating Japanese into Chinese is preset for the chatbot A-2. The user registers a translation engine as an external device for the chatbot A-1, and registers another translation engine as an external device for the chatbot A-2. In a case of translating Japanese into English, the user transmits a message to the chatbot A-1, and in a case of translating Japanese into Chinese, the user transmits a message to the chatbot A-2.

Meanwhile, in a case of the search service, search engines may be used as external devices, instead of the translation engines. In this case, the setting information corresponds to a search condition. For example, in searching for accommodations, the number of days, fees, hotel grade, and the number of guests may be included. By presetting the search condition as the setting information for each of the plural chatbots, the need for the work of registering the setting information by the user is obviated.

<Modification 2>

In Exemplary Embodiment 2, as illustrated in FIG. 11A or 11B, the icon 104 of the chatbot A-1 and the icon 105 of the chatbot A-2 are displayed. Meanwhile, the operation setting information of the chatbots A-1 and A-2 may be displayed in, for example, texts or figures along with the icons 104 and 105 so that the operation setting information can be visually recognized. For example, texts "eco" may be affixed in the vicinity of the icon 104, and texts "high image quality" may be affixed in the vicinity of the icon 105.

<Modification 3>

In Exemplary Embodiments 1 and 2, "eco preferred" is set as the operation setting information of the chatbot A-1, and "image quality preferred" is set as the operation setting information of the chatbot A-2. Meanwhile, these pieces of operation setting information may be set as basic information, and the user may customize any one of the pieces of operation setting information as necessary. For example, in a case where the operation setting information of the chatbot A-1 is preset as follows, color mode: monochrome (black-and-white),
double-sided setting: double sided,
the number of copies: 1,
N-up designation: 2-up, and
image quality mode: standard, the user transmits a message "Change the N-up designation to 1," to the chatbot A-1, so as to customize the N-up designation to 1-up.

Exemplary Embodiment 5

In Exemplary Embodiment 5, the bot server A which is a chatbot performs the printing process by driving the printer A or the printer B according to the setting information which is registered in advance for each user on the operation of the software robot program. The setting information may be referred to as an operation condition for operating the printer A or the printer B. The user A inputs and registers the setting information for operating the printer A by operating the user terminal A. and the user B inputs and registers the setting information for operating the printer B by operating the user terminal B.

The printer A (18A) and the printer B (18B) perform the image printing process by a command from the bot server A.

In Exemplary Embodiment 5, the operation instruction includes a printing instruction to the printers A and B and an instruction on the setting information of the printers A and B.

The user information storage unit 165 stores information of the user who uses the chatting service server 14, in particular, information of the user who uses the chatbot implemented by the bot server A, as a user information table. The chatbot is allocated with a specific account on the chatting service implemented by the chatting service server 14, and when the user designates the account and performs a specific operation to be brought into a state of being able to or being authorized to use the chatbot (hereinafter, referred to as "friend registration"), the use of the chatbot is determined. The user information is, for example, a user ID. Information on authority of each user may be stored.

The setting information storage unit 166 stores the setting information for each user who uses the chatbot implemented by the bot server A, as a table. The items of the setting information are, for example, identification information of a printer to be used, a color mode, a paper size, and the number of copies, but are not limited thereto. The setting information may be determined according to the contents of a service provided by the bot server A. For the printing service, the setting information is information on the printing. For a search service, the setting information is information on a search condition. The setting information is information for defining the contents of a service and may include plural items.

The message storage unit 167 functions as a storage unit to store the messages that the message reception unit 161 receives from the user, as a history. In addition to storing all messages in the group chatting, the message storage unit 167 may start a recording of messages when a specific condition is satisfied, and end the recording of messages when another specific condition is satisfied.

The operation controller 163 functions as a control unit to register the setting information on the operations of the printers A and B in the setting information storage unit 166 based on the analysis result obtained by the content analysis unit 162. Further, the operation controller 163 outputs a printing command to the printers A and B in response to a message from the user. Further, the operation controller 163 controls the start and the end of the message recording operation in the message storage unit 167. That is, the operation controller 163 controls (i) which messages are stored in the message storage unit 167 and (ii) when the messages are stored in the message storage unit 167. Further, the operation controller 163 reads and outputs the messages stored in the message storage unit 167 according to a request from the user. One of the output forms is the printing in the printer A but is not limited thereto.

In Exemplary Embodiment 5, the user A or the user B may register the chatbot as a friend so as to register the printers and the setting information, and transmit, for example, the message "Print" to the chatbot so as to cause the printing service to be performed with a desired printer and a desired printing condition.

Figures 23, 24:
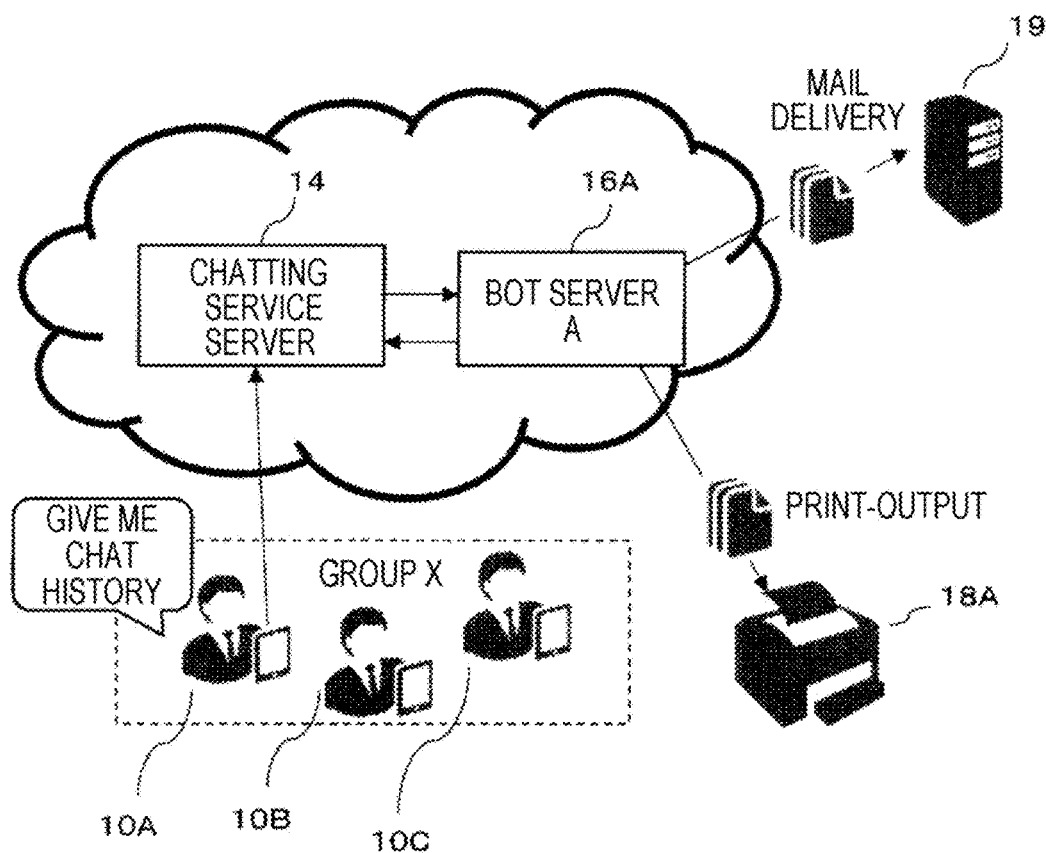
FIG. 23 is an explanatory view of stored messages according to Exemplary Embodiment 5.
FIG. 24 is an explanatory view of a process according to Exemplary Embodiment 5.

FIG. 23 illustrates an example of a message management table stored in the message storage unit 167. In a case where plural users, for example, a user A, a user B, and a user C constitute the same group and are performing a group chatting, the operation controller 163 performs a control to store the exchange of messages (chats) among the users in the message storage unit 167. When a message is stored in the message storage unit 167, attribute information thereof is stored together. The attribute information includes a user name or user ID of a transmission source of a message, a group name or ID to which the corresponding user belongs, a date when the message is transmitted, a format (type) of the message, and contents of the message. For example, when a text message is transmitted from the user A belonging to a group X, "X" as the group name, the user A as the user name, the date, text as the type, and the contents of the message are stored. When a user in the group transmits a specific label or stamp rather than a message, the label or sticker is also stored in the message storage unit 167 like a message. In FIG. 23, the type of a message from the user C is "sticker" which indicates that a specific label or sticker has been transmitted. The contents of the sticker are specified as an ID (ID1234) of the stamp. The meaning contents of the sticker are uniquely determined by the ID of the sticker. For example, the sticker of ID1234 indicates a sticker for instructing the printing.

The operation controller 163 stores, for example, a message or sticker exchanged in the group chatting, along with its attribute in the message storage unit 167. When a request is made from the user, the operation controller 163 extracts and outputs the message from the message storage unit 167 by using the attribute.

FIG. 24 schematically illustrates a message storing process and an outputting process according to the present exemplary embodiment.

It is assumed that the user A, the user B, and the user C form the group X, and when the users converse (chat) with each other by exchanging messages, the messages are supplied from the chatting service server 14 to the bot server A (16A) and sequentially stored and accumulated in the message storage unit 167 of the bot server A (16A). Instead of the chatting service server 14, the bot server A controls whether to store the messages. Then, for example, when the user A makes a message "Give me the chatting history" during the chatting, this message is supplied to the bot server A (16A) via the chatting service server 14, and the bot server A analyzes the contents of the message and accesses the message storage unit 167 to read and output one or plural messages (chatting history) stored in the message storage unit 167. Specifically, the messages are output to the printer A (18A) to be print-output, or output to an external mail server 19 to be output in a mail transmission form. The user information storage unit 165 stores the user information, and when the user information includes a mail address of the user A, an email is transmitted to the corresponding mail address so as to provide the user A with the chatting history.

The user A may designate the output form. For example, when the user makes a message "Print the chatting history," the bot server A (16A) analyzes the contents of the message and supplies the chatting history to the printer A (18A) for the print-output. Alternatively, for example, when the user makes a message "Email me the chatting history," the bot server A (16A) analyzes the contents of the message and supplies the chatting history to the mail server 19 for the mail transmission.

Hereinafter, by using an example where the output form of one or plural stored messages (chatting history) is, for example, the print-output in the printer A, the process performed among the user terminal, the chatbot, and the printer A will be described in more detail.

Figure 25:
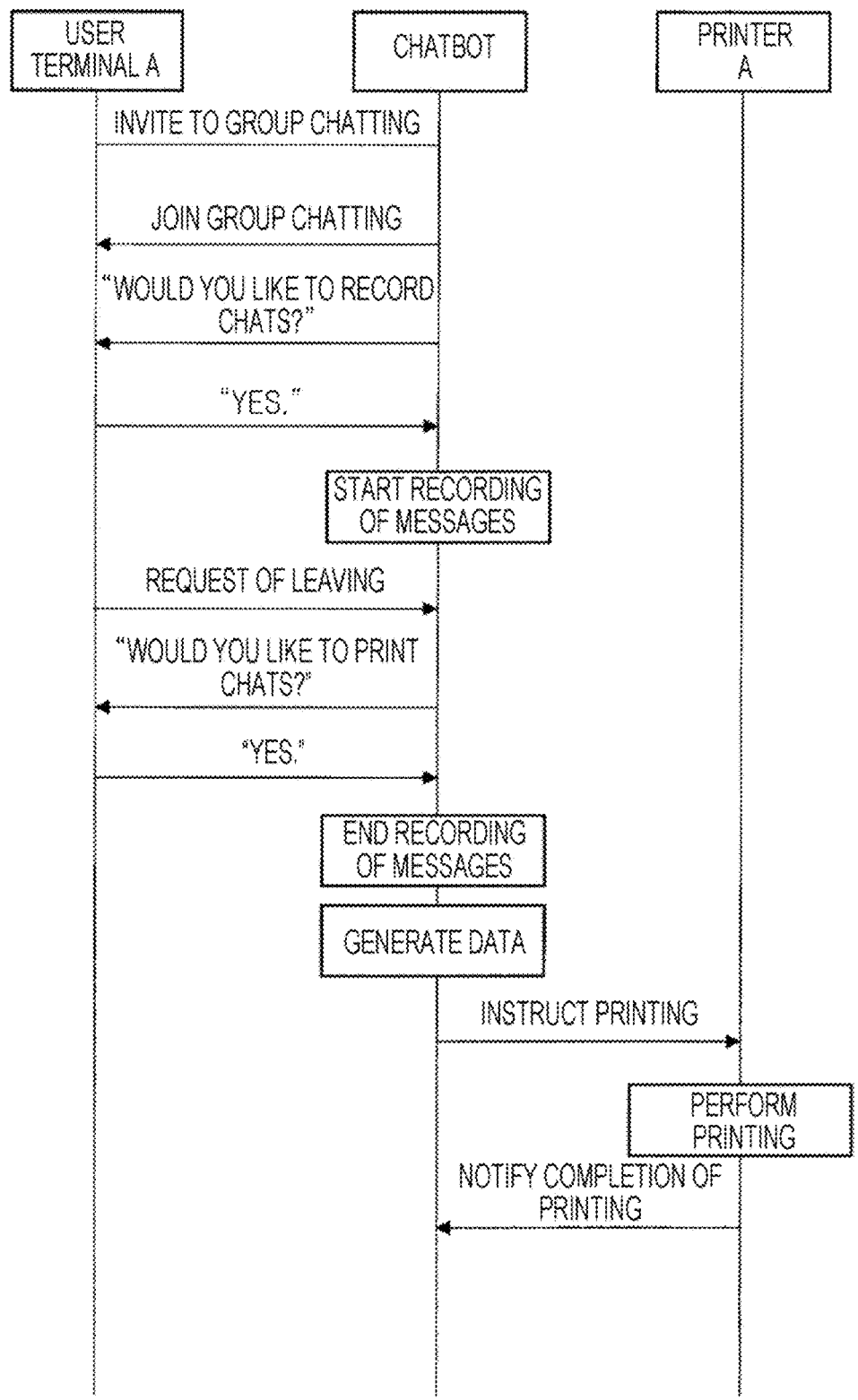
FIG. 25 is a sequence diagram of Exemplary Embodiment 5.

FIG. 25 illustrates a sequence diagram of the user terminal A, the chatbot, and the printer A. As illustrated in FIG. 24, it is assumed that the user A forms the group X together with the users B and C. Further, it is assumed that the user A registers the chatbot as a friend by operating the user terminal A to perform a specific operation (designate the account of the chatbot and operate a "friend registration" button). Here, the friend registration refers to an operation to acquire an authority to use the chatbot. The chatbot registers the user ID of the user A in the user information table. Likewise, it is assumed that the users B and C register the chatbot as a friend by operating the user terminal B. The chatbot registers the user IDs of the users B and C in the user information table. Further, the chatbot registers information indicating that the user A, the user B, and the user C constitute the same group.

First, the user A invites the chatbot to the group chatting formed by the user A, the user B, and the user C. The invitation is performed, for example, in the manner that the user A operates a specific button (invitation button) displayed on the user terminal A to transmit a specific command or email to the chatbot.

In response to the invitation, the chatbot joins the group chatting, and along with the joining in the group chatting, the chatbot creates and transmits a message "Would you like to record chats?"

When the user A views the message and transmits a positive message "Yes" through the user terminal A, the chatbot analyzes the contents of the message and sequentially records the exchange of subsequent messages (chats) within the corresponding group chatting in the message storage unit 167 according to the positive reply. The messages to be recorded include the attributes illustrated in FIG. 23, and thus, also include, for example, texts, a label, a sticker, an image, and voice.

Subsequently, the user terminal A requests the chatbot to leave the group chatting, at an arbitrary timing. Then, in response to the request for the leaving, the chatbot leaves the group chatting, and at the leaving time, the chatbot creates and transmits a message "Would you like to print the chats?" in response.

When the user A views the message and transmits a positive message "Yes" through the user terminal A, the chatbot analyzes the contents of the message, and according to the positive reply, the chatbot ends the recording of subsequent messages, reads the messages stored in the message storage unit 167 to create printing data (chatting history data), and outputs the printing instruction to the printer A by attaching the corresponding data.

The printer A performs the printing of the corresponding data (chatting history data) according to the printing instruction from the chatbot. The output form of the printing is determined by the setting information. When the printing is completed, the printer A notifies the chatbot of the completion of the printing in response.

By the processes above, all messages exchanged after the chatbot joins the group chatting until leaving the group chatting are recoded, and the corresponding messages are print-output as the chatting history from the printer A according to the request from the user constituting the group. Since the joining in or leaving from the group chatting is performed by a specific operation of the user terminal constituting the group, it may be said that the start or end of the recording of messages is controlled according to the specific operation of the user terminal.

In FIG. 25, after joining the group chatting, the chatbot creates and transmits a message "Would you like to record chats?," and when a positive reply is transmitted from the user terminal A in response to the message, the chatbot starts the recording of messages. However, the recording of messages may be started along with the joining in the group chatting.

In addition, when leaving the group chatting in response to the request for the leaving, the chatbot creates and transmits a message "Would you like to print the chats?" However, the recording of messages may be ended simultaneously with the leaving from the group chatting.

Exemplary Embodiment 6

In Exemplary Embodiment 5, the chatbot starts the recording of messages according to the positive reply of "Yes" from the user terminal A in response to the message "Would you like to record chats?" that the chatbot transmits at the time of joining the group chatting. However, alternatively, when a message from the user terminal is a specific message, the chatbot may start the recording of messages according to the specific message. The specific message may be determined depending on whether a message contains, for example, a predetermined keyword, symbol, and mark. In sum, the chatbot may control the start or end of the recording of messages according to the transmission of the specific message from the user in the group chatting.

Figure 26:
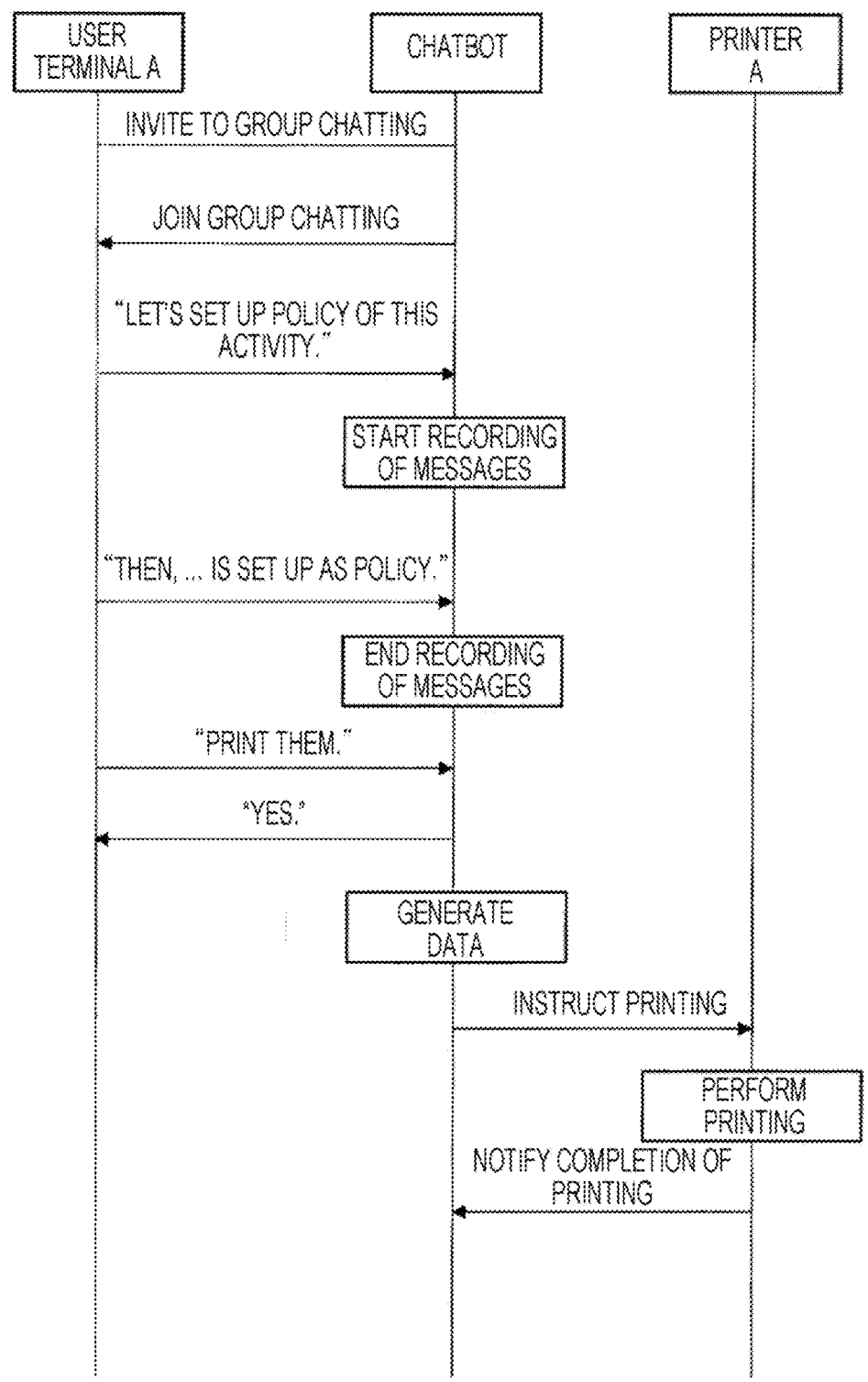
FIG. 26 is a sequence diagram of Exemplary Embodiment 6.

FIG. 26 illustrates a sequence diagram of the user terminal A, the chatbot, and the printer A according to the present exemplary embodiment. As in FIG. 25, it is assumed that, for example, the user A registers the chatbot as a friend, so as to be authorized to use the chatbot.

First, the user A invites the chatbot to the group chatting formed by the user A, the user B, and the user C.

The chatbot joins the group chatting in response to the invitation. In a state of joining the group chatting, the chatbot automatically responds to a message from the user terminal A, and appropriately performs the printing service for image data and others transmitted from the user terminal A.

Meanwhile, a message "Let's set up a policy of this activity" is transmitted from the user terminal A at an arbitrary timing.

The chatbot analyzes the contents of the message and determines whether the message contains predetermined keywords. When the predetermined keywords are, for example, "policy," "let's set up," "let's decide," and "decide," the message contains the keywords, and thus, the chatbot determines that the message corresponds to the specific message. Then, the chatbot starts the recording of subsequent messages, by regarding the transmitted message as the specific message (first specific message).

Thereafter, when messages are exchanged among the users constituting the group, the messages are sequentially recorded and accumulated.

Subsequently, a message "Then, . . . is set up as policy" is transmitted from the user terminal A at an arbitrary timing.

The chatbot analyzes the contents of the message and determines whether the message contains predetermined keywords. When the predetermined keywords are, for example, "policy," "set up," "let's decide," and "decided," the message contains the keywords, and thus, the chatbot determines that the message corresponds to the specific message. Then, the chatbot ends the recording of messages, by regarding the transmitted message as the specific message (second specific message).

Subsequently, when a message "Print them" is transmitted from the user terminal A, the chatbot analyzes the contents of the message, creates and transmits a message "Ok" in response, reads the messages stored in the message storage unit 167 to create printing data (chatting history data), and outputs the printing instruction to the printer A by attaching the corresponding data.

The printer A performs the printing of the corresponding data (chatting history data) according to the printing instruction from the chatbot. When the printing is completed, the printer A notifies the chatbot of the completion of the printing in response.

By the processes above, in a state where the chatbot is joining the group chatting, all messages exchanged after the first specific message is transmitted from the user terminal until the second specific message is transmitted are recorded, and the corresponding messages are print-output as a chatting history from the printer A according to the request from the user.

The keywords may be preset by any one of the users constituting the group, or may be set by the administrator of the chatting service. The keywords may be fixed, or addition or deletion may be appropriately performed with respect to the keywords. In addition, the user may set the keywords as one of the pieces of setting information.

In FIG. 26, the start and the end of the recording of messages are controlled according to whether a message corresponds to the specific message. However, the start and the end of the recording of messages may be controlled according to a specific sticker.

For example, the recording may be started when a sticker of a visual representation figure (icon) of the recording is transmitted, and the recording may be ended when a sticker of an icon indicating the stop of the recording is transmitted.

In addition, when a message corresponds to the first specific message, the recording of subsequent messages is started. However, at this time, an attribute of the messages to be recorded by the first specific message may be designated. For example, when the user A operates the user terminal A to transmit a message "Let's set up a policy of this activity. Record chats between Mr. A and Mr. B," the chatbot records only messages from the user terminals A and B among the subsequent messages. For example, when the subsequent messages include messages from the user terminal C constituting the group X, the messages from the user terminal C are excluded from the object to be recorded.

In addition, in a case where a flag of "important" can be set as an attribute of messages, when the user A operates the user terminal A to transmit a message "Let's set up a policy of this activity. Record only important messages," the chatbot records only messages to which the flag of "important" is affixed, among the subsequent messages. For example, when messages from the user terminal B include messages to which the flag of "important" is not affixed, the messages that do not have the flag are excluded from the object to be recorded.

In addition, when the user A operates the user terminal A to transmit a message "Let's set up a policy of this activity. Record only today's messages," the chatbot records only messages transmitted today among the subsequent messages.

In addition, when the user A operates the user terminal A to transmit a message "Let's set up a policy of this activity. Record only messages containing the character string of *," the chatbot records only messages containing the character string "*" among the subsequent messages.

In sum, by designating the attribute of messages, the user may appropriately select messages to be stored in the message storage unit 167.

Exemplary Embodiment 7

In Exemplary Embodiments 5 and 6, all the messages recorded in the message storage unit 167 are output. However, among the messages recorded in the message storage unit 167, only user's requested or desired messages may be output.

Figure 27:
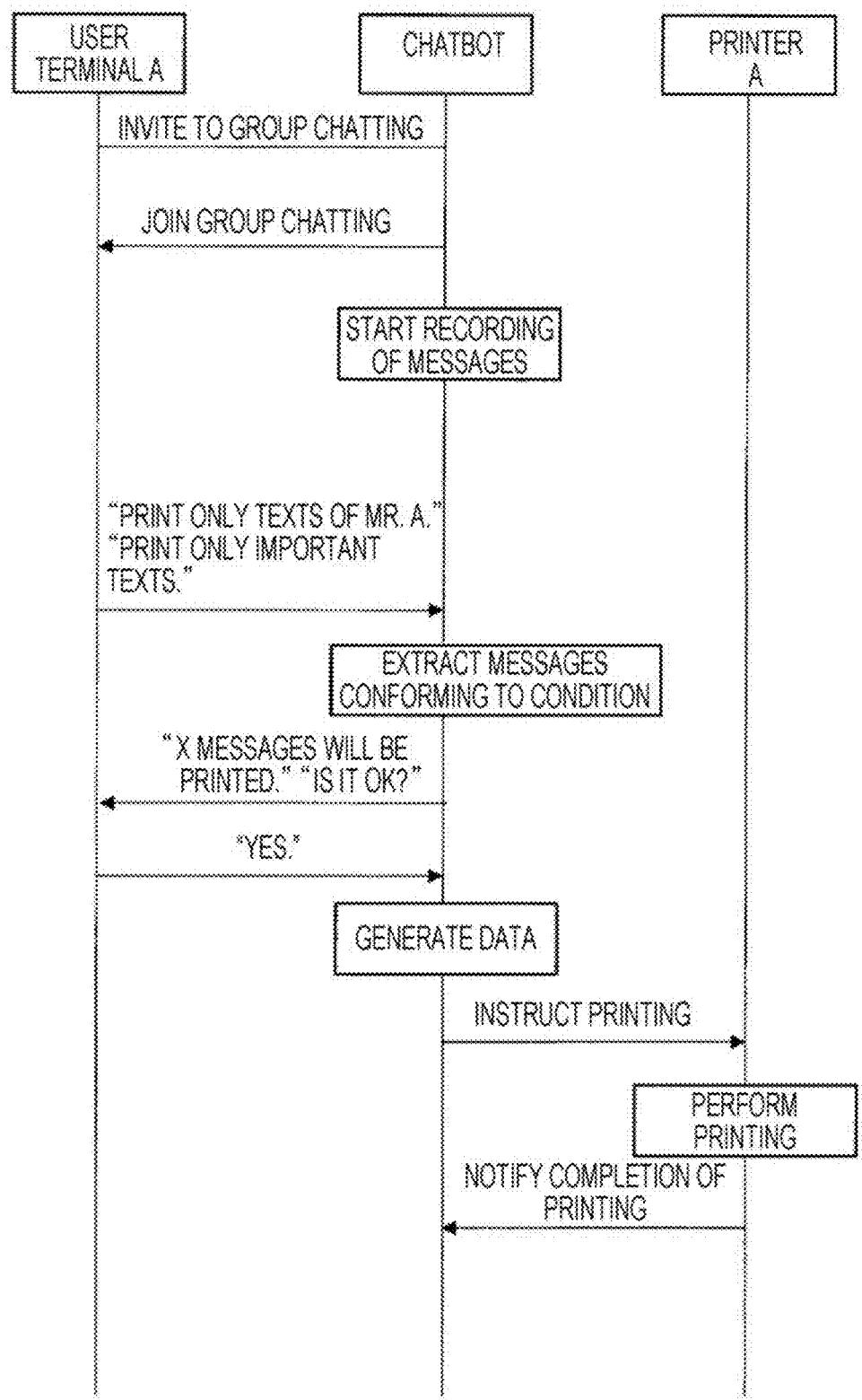
FIG. 27 is a sequence diagram of Exemplary Embodiment 7.

FIG. 27 illustrates a sequence diagram of the user terminal A, the chatbot, and the printer A according to the present exemplary embodiment. As in FIG. 25, it is assumed that, for example, the user A registers the chatbot as a friend, so as to be authorized to use the chatbot.

First, the user A invites the chatbot to the group chatting formed by the user A, the user B, and the user C.

In response to the invitation, the chatbot joins the group chatting, and along with the joining in the group chatting, the chatbot creates and transmits a message "Would you like to record chats?"

When the user A views the message and transmits a positive message "Yes" through the user terminal A, the chatbot analyzes the contents of the message and sequentially records the exchange of subsequent messages (chats) within the corresponding group chatting in the message storage unit 167 according to the positive reply. The messages to be recorded include the attributes illustrated in FIG. 23, and thus, also include, for example, texts, a label, a sticker, an image, and voice.

Subsequently, the user A operates the user terminal A to transmit messages of "Print only texts of Mr. A" and "Print only important texts" at an arbitrary timing. That is, the user A requests only messages of "Mr. A," that is, messages of the user A, and only important messages, rather than all the messages stored in the message storage unit 167. "Mr. A" and "important" are the attributes of messages, and the user A designates and requests the attributes.

Upon receiving the messages, the chatbot analyzes the contents of the messages, extracts messages with the attribute "Mr. A," that is, messages of the user A from the messages stored in the message storage unit 167 according to the message "Print only texts of Mr. A," and extracts messages with the attribute "important" from the extracted messages. The attribute "important" may be added by the user himself/herself who has transmitted the corresponding message, or the chatbot may analyze the contents of the message and automatically add the attribute. For example, when a message contains a specific keyword, the chatbot may determine that the message is "important" and add the attribute. The importance of a message may be divided into, for example, three levels (normal, important, and most important), and important and most important messages may be extracted.

After extracting the messages which are the messages of the user A and are "important," the chatbot counts the number of the extracted messages, and creates and transmits a message "X messages will be printed. Is it OK?" in response.

When the user A views the message and transmits a positive message "Ok" through the user terminal A, the chatbot analyzes the contents of the message, and according to the positive reply, the chatbot creates printing data (part of chatting history data) from the extracted messages, and outputs the printing instruction to the printer A by attaching the corresponding data.

According to the printing instruction from the chatbot, the printer A performs the printing of the corresponding data (part of chatting history data). When the printing is completed, the printer A notifies the chatbot of the completion of the printing in response.

By the processes above, among the messages recorded in the message storage unit 167, only the messages conforming to the request from the user terminal A, that is, only the important ones of the messages from the user terminal A are print-output from the printer A.

In FIG. 27, the request is made by transmitting the messages "Print only texts of Mr. A" and "Print only important texts" through the user terminal A. However, messages containing a specific character string may be requested. For example, a message "Print only texts containing the character string ***" may be transmitted. In addition, a message designating a time period such as "Print only texts from X month Y day to Z month W day" or a message designating a specific date such as "Print only images on X month Y day" may be transmitted.

Exemplary Embodiment 8

In Exemplary Embodiment 5, according to the request for the leaving through the user terminal, the chatbot ends the recording of messages when leaving the group chatting. Meanwhile, the messages recorded in the message storage unit 167 until that time may be either deleted or kept after the leaving. Likewise, the messages may be deleted or kept after the print-output.

Figure 28:
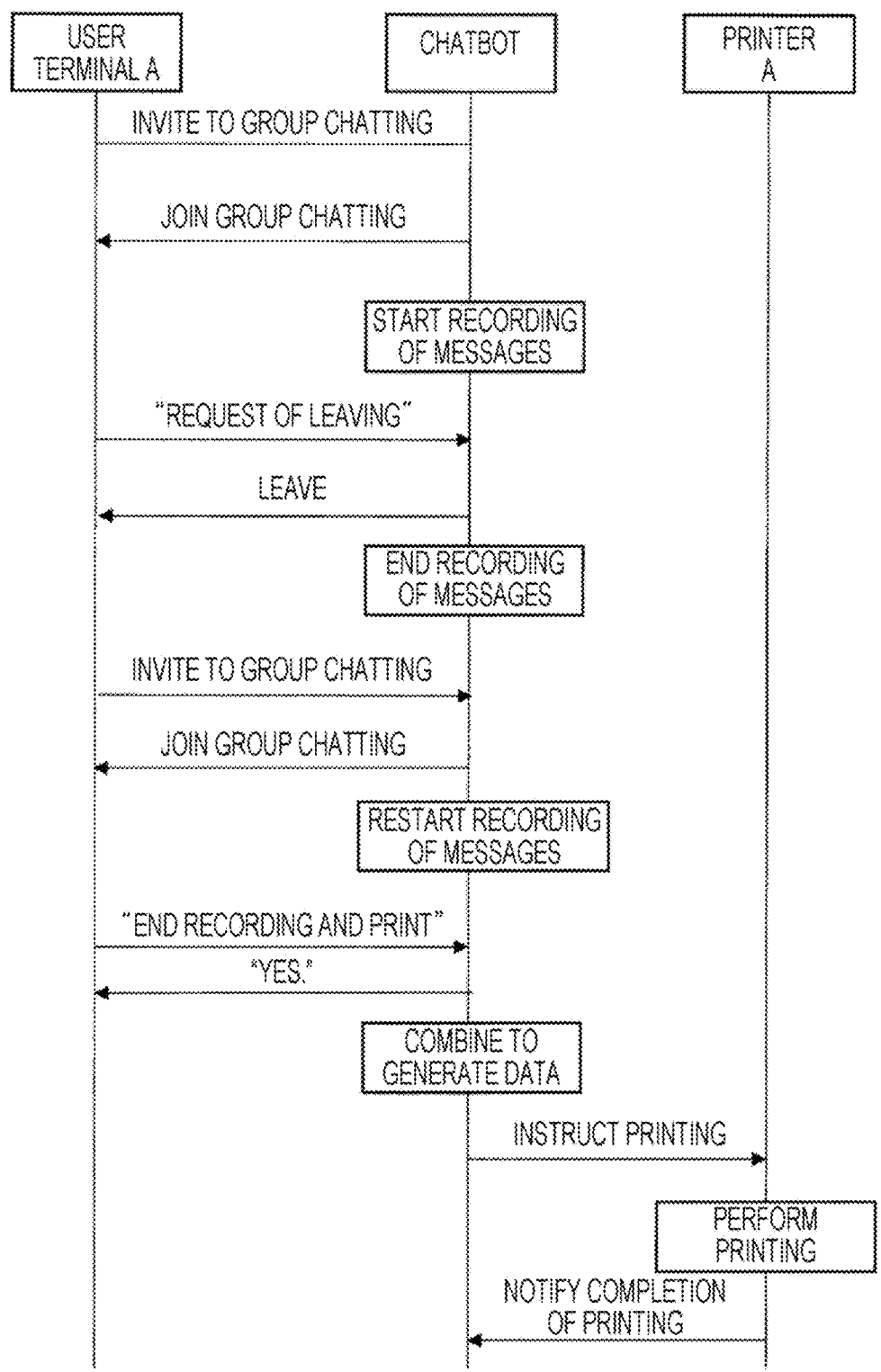
FIG. 28 is a sequence diagram of Exemplary Embodiment 8.

FIG. 28 illustrates a sequence diagram of the user terminal A, the chatbot, and the printer A according to the present exemplary embodiment.

First, the user A invites the chatbot to the group chatting formed by the user A, the user B, and the user C.

In response to the invitation, the chatbot joins the group chatting, and along with the joining in the group chatting, the chatbot sequentially records the exchange of subsequent messages (chats) within the corresponding group chatting in the message storage unit 167. The messages to be recorded include the attributes illustrated in FIG. 23, and thus, also include, for example, texts, a label, a sticker, an image, and voice.

Subsequently, the user terminal A requests the chatbot to leave the group chatting, at an arbitrary timing. Then, the chatbot leaves the group chatting according to the request for the leaving, and ends the recording of subsequent messages. The chatbot keeps the messages stored in the message storage unit 167 even after leaving the group chatting.

Subsequently, the user A invites the chatbot again to the group chatting formed by the users A. B, and C.

In response to the re-invitation, the chatbot joins the group chatting, and along with the joining in the group chatting, the chatbot records the exchange of subsequent messages (chats) within the corresponding group chatting again in the message storage unit 167.

Subsequently, when a message "End the recording and Print" is transmitted from the user terminal A at an arbitrary timing, the chatbot analyzes the contents of the message, ends the recording of messages, and creates and transmits a message "Ok" in response. Then, the chatbot combines the messages recorded when the chatbot joined the group chatting for the first time and the messages recorded when the chatbot joined the group chatting second time with each other to create printing data (chatting history data), and outputs the printing instruction to the printer A by attaching the corresponding data.

The printer A performs the printing of the corresponding data (chatting history data) according to the printing instruction from the chatbot. When the printing is completed, the printer A notifies the chatbot of the completion of the printing in response.

In the present exemplary embodiment, after leaving the group chatting, the chatbot keeps the messages recorded until that time in the message storage unit 167. However, when the messages recorded until that time are deleted, only the messages after the re-joining at the second time are stored and accumulated in the message storage unit 167. Accordingly, in this case, the process of combining the messages during the first joining and the messages during the second joining with each other is not performed.

In addition, when the messages recorded until that time are deleted after the leaving, messages with a specific attribute may not be deleted and may be kept. For example, messages to which the flag of "important" is affixed or messages of a specific user may not be deleted and may be kept.

In addition, when the chatbot print-outputs only some of the messages stored in the message storage unit 167, and then, leaves the group chatting, the chatbot may delete only the print-output messages and may keep the messages that were not print-output. As a result, the capacity for the recording may be secured, and the kept messages may be provided for next print-output.

Exemplary Embodiment 9

In Exemplary Embodiments 5 to 8, the users constituting the group are targeted. However, when a user other than the users constituting the group makes a request, the request may be regulated from the viewpoint of security.

Figure 29:
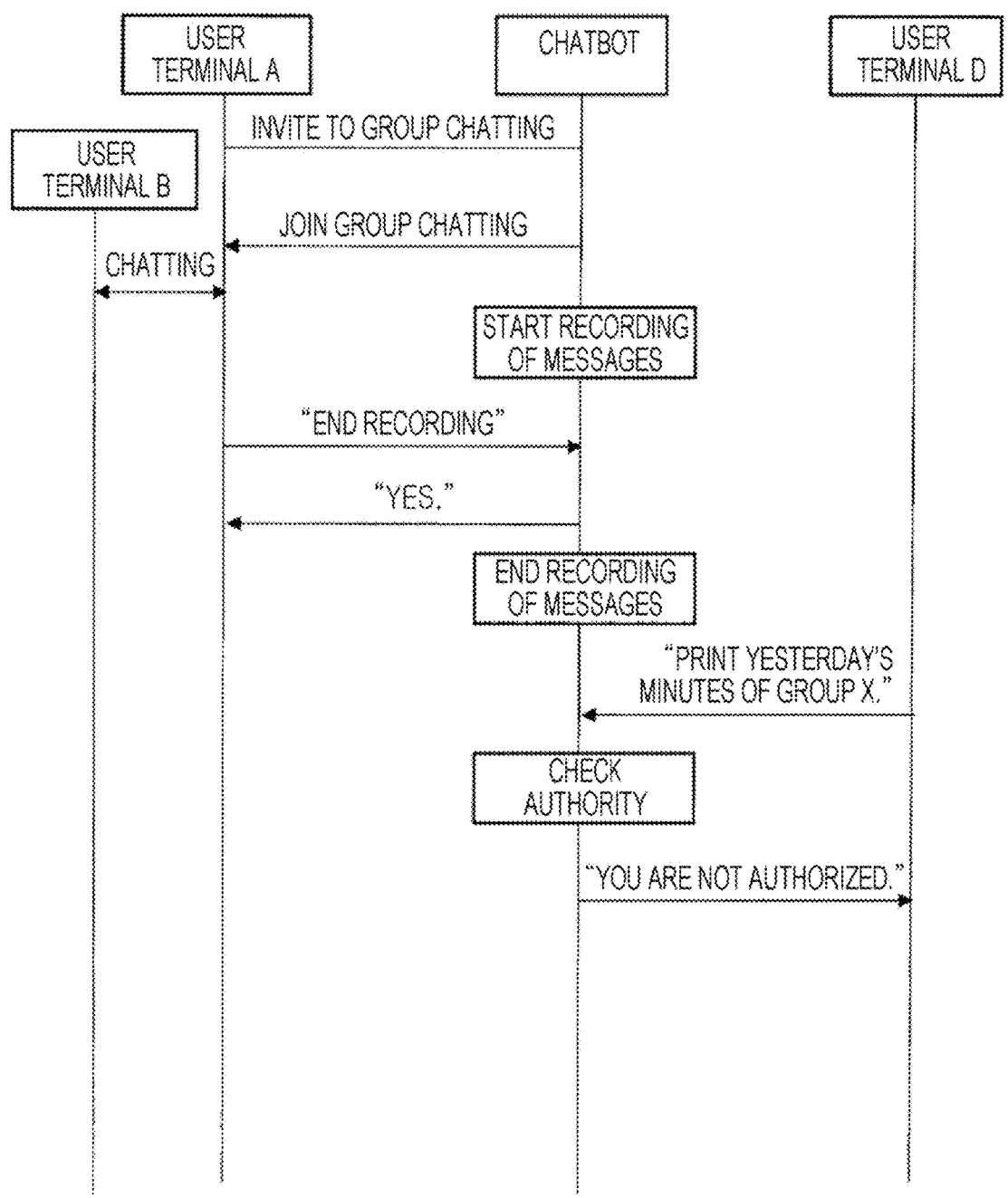
FIG. 29 is a sequence diagram of Exemplary Embodiment 9.

FIG. 29 illustrates a sequence diagram of the user terminals A, B, and D, and the chatbot according to the present exemplary embodiment. It is assumed that while the users A, B, and C constitute the group X, the user D does not constitute the group X.

First, the user A invites the chatbot to the group chatting formed by the user A, the user B, and the user C.

In response to the invitation, the chatbot joins the group chatting, and along with the joining in the group chatting, the chatbot records the messages within the group chatting in the message storage unit 167. Accordingly, for example, when messages are exchanged between the user terminals A and B, the messages are sequentially recorded.

Thereafter, when a message "End the recording" is transmitted from the user terminal A at an arbitrary timing, the chatbot analyzes the contents of the message and ends the recording of subsequent messages.

Subsequently, when a message "Print yesterday's minutes of the group X" is transmitted from the user terminal D, the chatbot specifies the user D who is the transmission source of the message, and determines whether the user D matches the user information stored in the user information storage unit 165, that is, whether the user D matches the users constituting the group X. When the user D does not constitute the group X, the chatbot determines that the user D is not authorized to access the messages of the group X that are recorded in the message storage unit 167. Then, the chatbot creates and transmits a message "You are not authorized," in response, and refuses the request of the user terminal D.

Exemplary Embodiment 10

In Exemplary Embodiment 9, the request from the user D who does not constitute the group X is refused. However, in a case where at least one of the users A, B, and C who constitute the group X and the user D constitute a group other than the group X, the chatbot may determine that the user D has the authority, and may permit the request instead of refusing the request.

Figure 30:
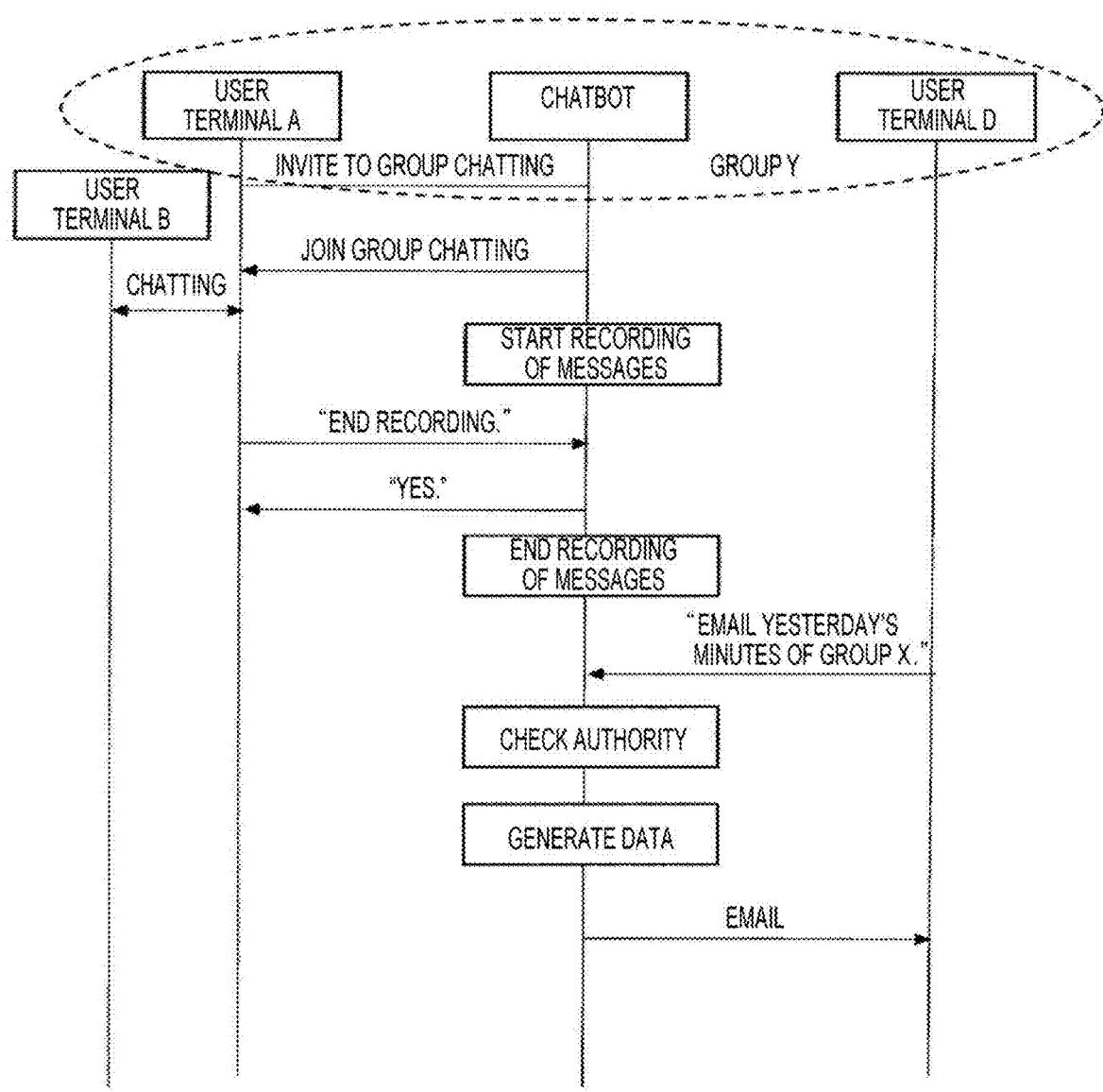
FIG. 30 is a sequence diagram of Exemplary Embodiment 10.

FIG. 30 illustrates a sequence diagram of the user terminals A, B, and D and the chatbot according to the present exemplary embodiment. It is assumed that while the users A, B, and C constitute the group X, the user D does not constitute the group X and constitutes another group Y together with the user A.

First, the user A invites the chatbot to the group chatting formed by the user A, the user B, and the user C.

In response to the invitation, the chatbot joins the group chatting, and along with the joining in the group chatting, the chatbot records the messages within the group chatting in the message storage unit 167. Accordingly, for example, when messages are exchanged between the user terminals A and B, the messages are sequentially recorded.

Thereafter, when a message "End the recording" is transmitted from the user terminal A at an arbitrary timing, the chatbot analyzes the contents of the message and ends the recording of subsequent messages.

Subsequently, when a message "Email yesterday's minutes of the group X" is transmitted from the user terminal D, the chatbot specifies the user D who is the transmission source of the message, and determines whether the user D matches the user information stored in the user information storage unit 165, that is, whether the user D matches the users constituting the group X. In a case where the user D does not constitute the group X but constitutes another group Y together with the user A, the chatbot determines that the user D is authorized to access the messages of the group X that are recorded in the message storage unit 167. Then, the chatbot accesses the message storage unit 167 to generate data in the mail format from the recorded messages, and acquires the mail address of the user D from the user information storage unit 165 to transmit the mail address to the mail server 19.

When the chatbot leaves the group chatting after emailing the minutes to the user D, the messages recorded in the message storage unit 167 may be deleted as in the print-output case.

In addition, when the emailed minutes are a part of the messages recorded in the message storage unit 167, only the emailed minutes may be deleted, and the messages that are not emailed may be kept.

In addition, considering that the user D is a user outside the group X, the chatbot may keep all the messages including the emailed minutes. That is, the subsequent processing of the messages recorded in the message storage unit 167 may be adaptively changed according to the user attribute of the output destination such as the print-output or email.

Exemplary Embodiment 11

In Exemplary Embodiment 9, the request from the user D who does not constitute the group X is refused. However, it may be inquired of at least one of the users A, B, and C constituting the group X about whether to permit the request from the user D, and when a reply for permitting the request is obtained from any one of the users A, B, and C, the chatbot may permit the request from the user D, instead of refusing the request.

Figure 31:
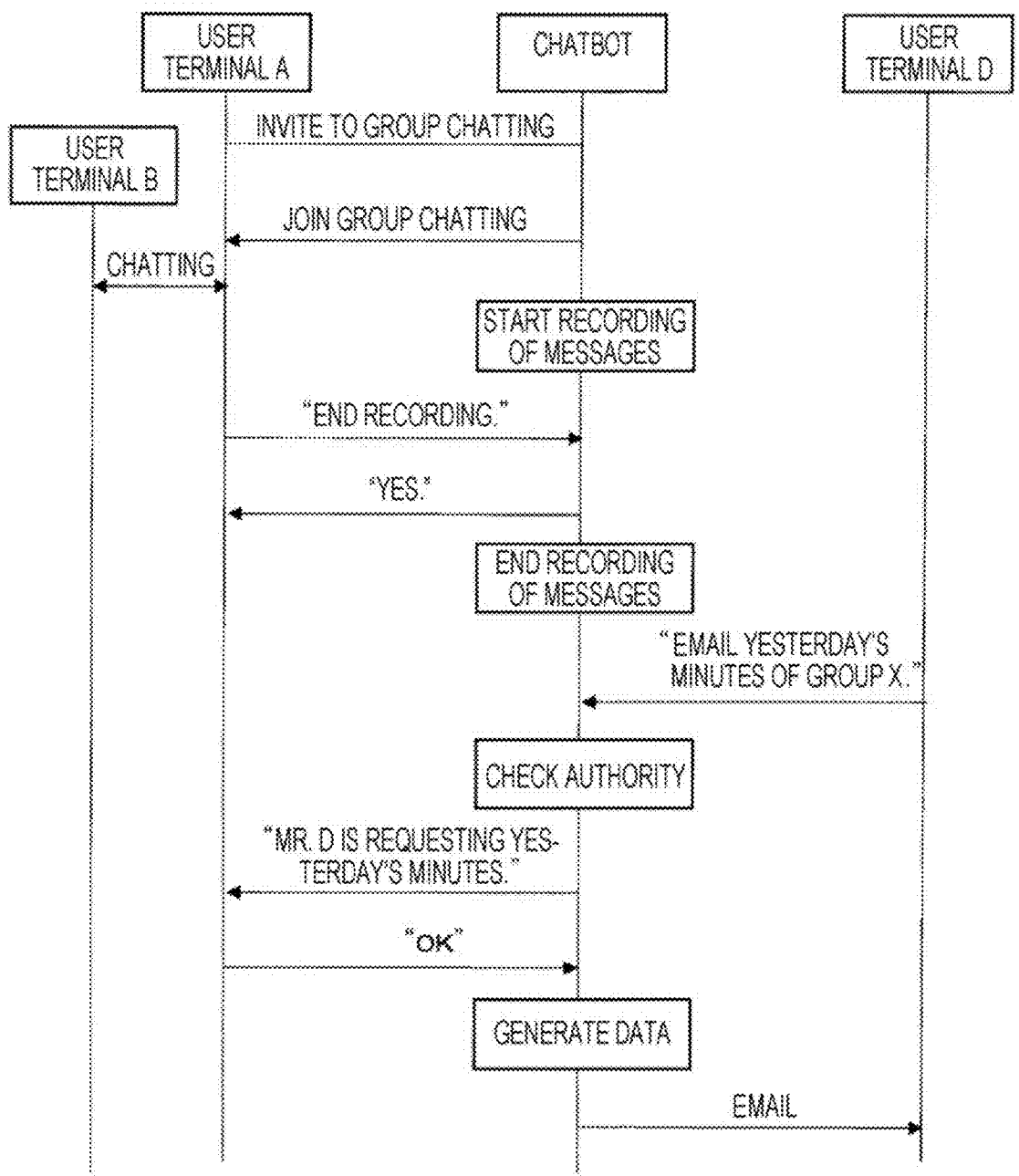
FIG. 31 is a sequence diagram of Exemplary Embodiment 11.

FIG. 31 illustrates a sequence diagram of the user terminals A, B, and D, and the chatbot according to the present exemplary embodiment. It is assumed that the users A, B, and C constitute the group X, and the user D does not constitute the group X.

First, the user A invites the chatbot to the group chatting formed by the user A, the user B, and the user C.

In response to the invitation, the chatbot joins the group chatting, and along with the joining in the group chatting, the chatbot records the messages within the group chatting in the message storage unit 167. Accordingly, for example, when messages are exchanged between the user terminals A and B, the messages are sequentially recorded.

Thereafter, when a message "End the recording" is transmitted from the user terminal A at an arbitrary timing, the chatbot analyzes the contents of the message and ends the recording of subsequent messages.

Subsequently, when a message "Email yesterday's minutes of the group X" is transmitted from the user terminal D, the chatbot specifies the user D who is the transmission source of the message, and determines whether the user D matches the user information stored in the user information storage unit 165, that is, whether the user D matches the users constituting the group X. In a case where the user D does not constitute the group X, the chatbot creates a message "Mr. D is requesting the yesterday's minutes" and transmits the message to the user terminal constituting the group X, for example, the user terminal A.

When all the users who are joining the group chatting view the message, and especially, the user A viewing the message transmits a message "Ok" by operating the user terminal A, the chatbot determines that the user D acquires the authority to access the messages of the group X which are recorded in the message storage unit 167 according to the positive message from the user terminal A. Then, the chatbot accesses the message storage unit 167 to generate data in the mail format from the recorded messages, and acquires the mail address of the user D from the user information storage unit 165 to transmit the mail address to the mail server 19.

Meanwhile, in FIG. 31, when a negative message such as "No," "do not permit," or "not" is transmitted from the user terminal A, the chatbot refuses the request from the user D, and creates and transmits a message such as "You are not authorized" or "The request is refused" in response. In this case, the chatbot may inform to the user D that the user D may acquire the minutes by becoming a member of the group X. For example, the chatbot may create and transmit a message "You may become a member of the group X to access the minutes" in response.

In addition, rather than transmitting the message for requesting the permission to all the users A, B, and C who constitute the group X, the chatbot may request the permission from only a specific user. For example, the chatbot may create and transmit a message "@Mr. A Mr. D is requesting the yesterday's minutes" by targeting only the user A who invited the chatbot to the group X. Here, "@Mr. A" indicates the transmission toward the user A.

Exemplary Embodiment 12

Figure 32:
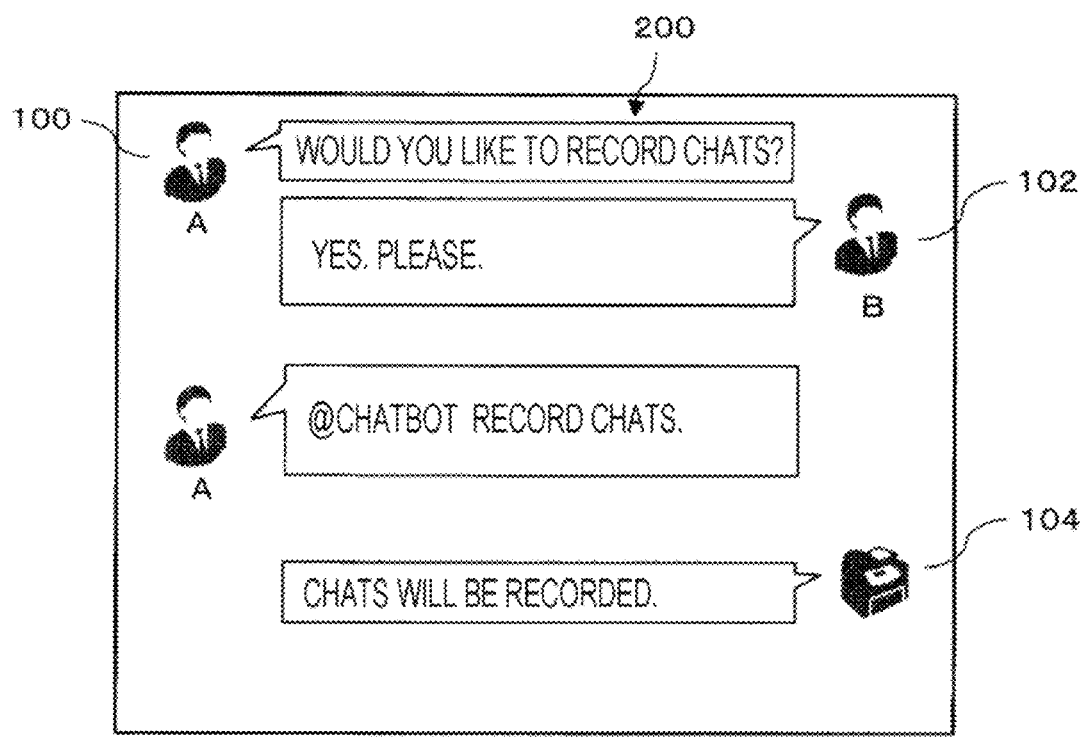
FIG. 32 is an explanatory view of a screen of a user terminal according to Exemplary Embodiment 12.

FIG. 32 illustrates an example of the screen displayed on the display unit of the user terminal A in a case where the recording of messages is started according to a specific message from the user terminal A. The screen of the user terminal A displays the visual representation figure (icon) 100 representing the user A, an icon 102 of the user B constituting the group X together with the user A, and the icon 104 representing the chatbot, by the chatting service server 14. The messages 200 of the users A and B and the chatbot are displayed sequentially from the top to the bottom.

First, the user A operates the user terminal A to transmit a message "Would you like to record chats?"

Upon viewing the message, the user B operates the user terminal B to transmit a message "Yes, please" in response.

Upon viewing the message, the user A operates the user terminal A to transmit a message "@Chatbot record chats."

As seen from "@Chatbot," the message is directed toward the chatbot, and the chatbot analyzes the contents of the message and starts the recording of subsequent messages. Then, the chatbot creates and transmits a message "Chats will be recorded" in response.

Exemplary Embodiment 13

Figure 33:
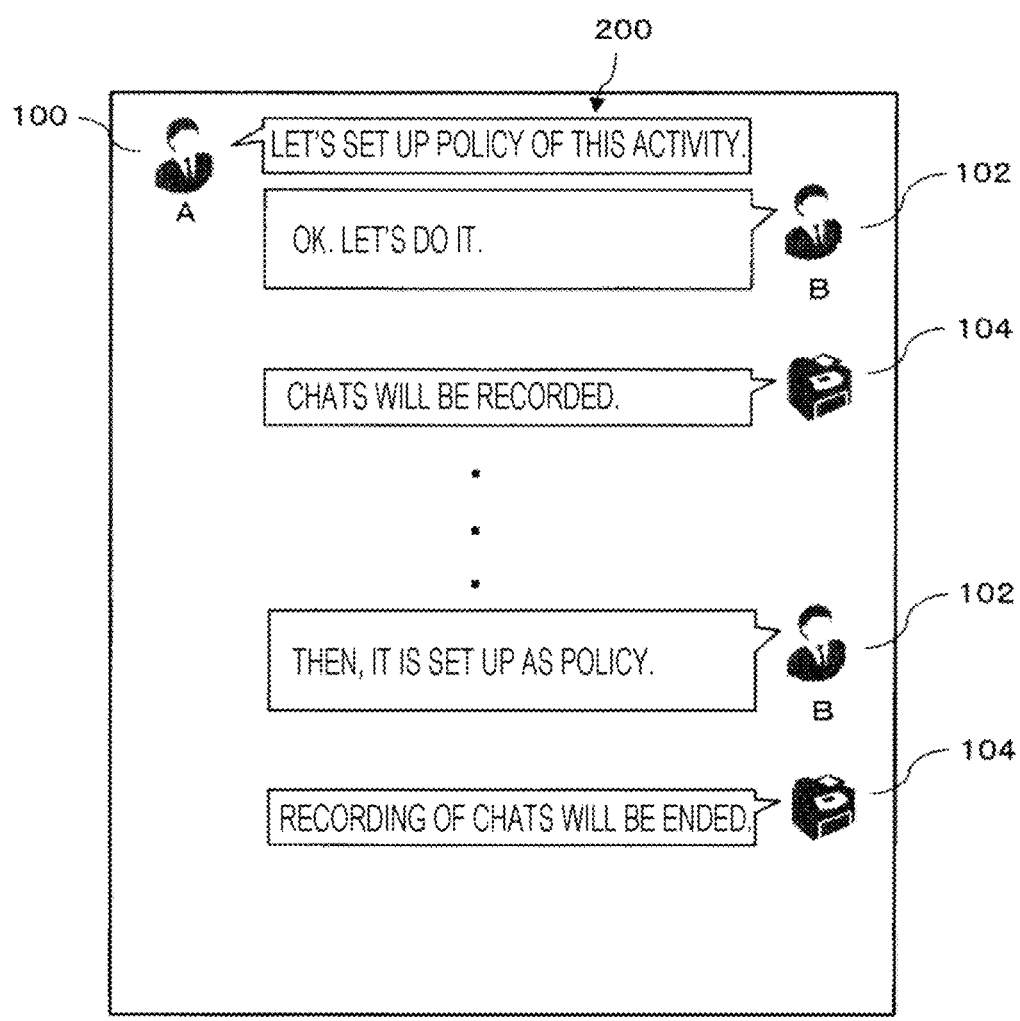
FIG. 33 is an explanatory view of a screen of a user terminal according to Exemplary Embodiment 13.

FIG. 33 illustrates another example of the screen displayed on the display unit of the user terminal A in a case where the recording of messages is started according to a specific message from the user terminal A. The screen of the user terminal A displays the icon 100 representing the user A, the icon 102 of the user B constituting the group X together with the user A, and the icon 104 representing the chatbot, by the chatting service server 14. The messages 200 of the users A and B and the chatbot are displayed sequentially from the top to the bottom.

First, the user A operates the user terminal A to transmit a message "Let's set up a policy of this activity."

Upon viewing the message, the user B operates the user terminal B to transmit a message "Ok. Let's do it."

Meanwhile, the chatbot analyzes the contents of the message from the user terminal A, determines that the message corresponds to the first specific message containing the specific keywords "policy" and "set up," and starts the recording of subsequent messages. Then, the chatbot creates and transmits a message "Chats will be recorded."

Subsequently, the messages exchanged between the user terminals A and B are sequentially recorded in the message storage unit 167.

Thereafter, when the user B operates the user terminal B to transmit a message "Then, it is set up as policy" at an arbitrary timing, the chatbot analyzes the contents of the message, determines that the message corresponds to the second specific message containing the specific keywords "policy" and "set up," and ends the recording of messages. Then, the chatbot creates and transmits a message "The recording of chats is ended."

The chatbot may create and transmit the inquiring message "Would you like to record chats?" prior to starting the recording of messages, and create and transmit the inquiring message "Would you like to end the recording?" prior to ending the recording of messages.

Exemplary Embodiment 14

Figure 34:
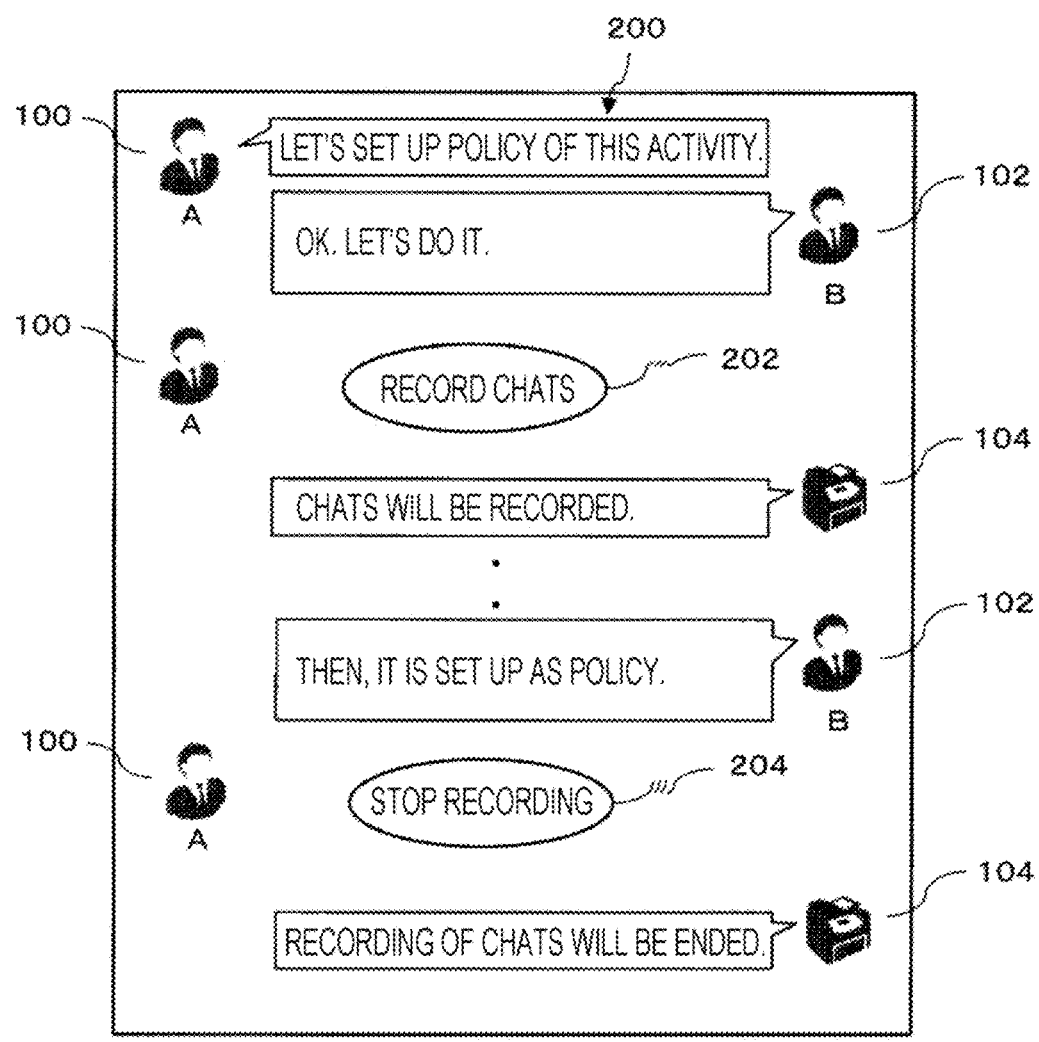
FIG. 34 is an explanatory view of a screen of a user terminal according to Exemplary Embodiment 14.

FIG. 34 illustrates an example of the screen displayed on the display unit of the user terminal A in a case where the recording of messages is started according to a specific sticker from the user terminal A. The screen of the user terminal A displays the icon 100 representing the user A, the icon 102 of the user B constituting the group X together with the user A, and the icon 104 representing the chatbot, by the chatting service server 14. The messages 200 of the users A and B and the chatbot are displayed sequentially from the top to the bottom.

First, the user A operates the user terminal A to transmit a message "Let's set up a policy of this activity."

Upon viewing the message, the user B operates the user terminal B to transmit a message "Ok. Let's do it."

Subsequently, the user A operates the user terminal A and transmits a sticker 202 of "Record chats."

The chatbot analyzes the contents of the sticker 202, and when it is determined that the sticker 202 corresponds to a first specific sticker, the chatbot starts the recording of subsequent messages. Then, the chatbot creates and transmits a message "Chats will be recorded."

Subsequently, the messages exchanged between the user terminals A and B are sequentially recorded in the message storage unit 167.

Thereafter, the user B operates the user terminal B to transmit a message "Then, it is set up as policy" at an arbitrary timing, and subsequently, the user A operates the user terminal A to transmit a sticker 204 of "Stop the recording."

The chatbot analyzes the contents of the sticker 204, and when it is determined that the sticker 204 corresponds to a second specific sticker, the chatbot stops the recording of messages. Then, the chatbot creates and transmits a message "The recording of chats is ended."

Exemplary Embodiment 15

Figure 35:
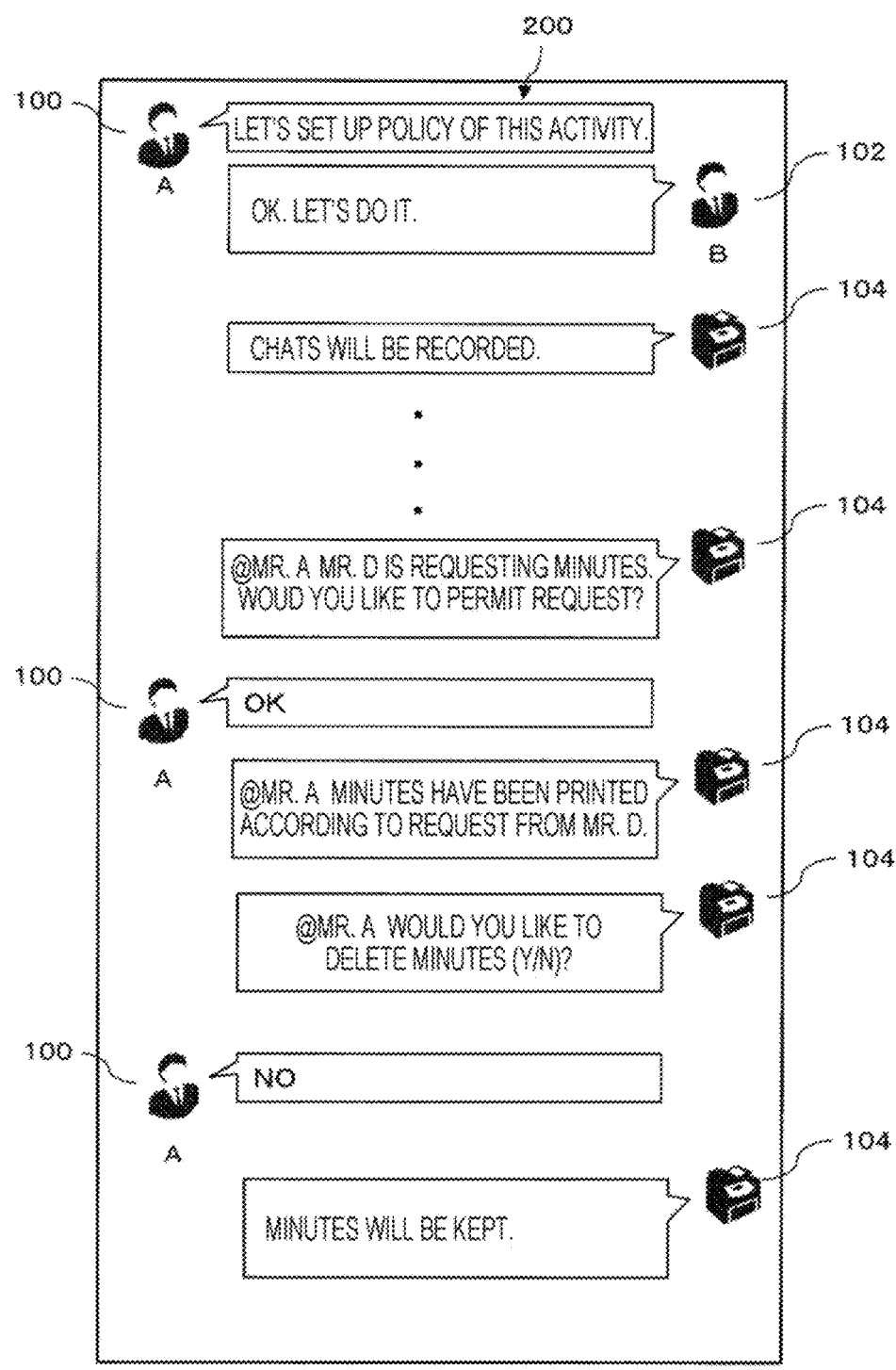
FIG. 35 is an explanatory view of a screen of a user terminal according to Exemplary Embodiment 15.

FIG. 35 illustrates another example of the screen displayed on the display unit of the user terminal A in a case where the recording of messages is started according to a specific message from the user terminal A. The screen of the user terminal A displays the icon 100 representing the user A, the icon 102 of the user B constituting the group X together with the user A, and the icon 104 representing the chatbot, by the chatting service server 14. The messages 200 of the users A and B and the chatbot are displayed sequentially from the top to the bottom.

First, the user A operates the user terminal A to transmit a message "Let's set up a policy of this activity."

Upon viewing the message, the user B operates the user terminal B to transmit a message "Ok. Let's do it."

Meanwhile, the chatbot analyzes the contents of the message from the user terminal A, determines that the message corresponds to the first specific message containing the specific keywords "policy" and "set up," and starts the recording of subsequent messages. Then, the chatbot creates and transmits a message "Chats will be recorded."

Subsequently, the messages exchanged between the user terminals A and B are sequentially recorded in the message storage unit 167.

Thereafter, it is assumed that the user D who does not constitute the group X operates the user terminal D to request the print-output of the recorded minutes, at an arbitrary timing. In this case, the chatbot creates a message "@Mr. A Mr. D is requesting the minutes. Would you like to permit the request?," and transmits the message to the user A.

Upon viewing the message, the user A operates the user terminal A to transmit a message "Ok."

The chatbot analyzes the contents of the message from the user terminal A, and according to the positive reply, the chatbot permits the request of the user D and print-outputs the minutes. Then, the chatbot creates and transmits a message "@Mr. A The minutes have been printed according to the request from Mr. D."

When the minutes are print-output, the chatbot may delete the messages of the print-output minutes from the message storage unit 167 after leaving the group chatting, or may inquire of the user about whether to delete the messages.

That is, the chatbot creates and transmits a message inquiring about whether to delete the print-output minutes. For example, the chatbot creates and transmits a message "@Mr. A would you like to delete the minutes? (Y/N)."

Upon viewing the message, the user A operates the user terminal A to transmit a message "No." According to the negative reply from the user terminal A, the chatbot does not delete but keeps the messages of the minutes that have been recorded in the message storage unit 167 and print-output. Then, the chatbot creates and transmits a message "The minutes are kept," in response.

While Exemplary Embodiments 5 to 15 have been described, the invention is not limited to the exemplary embodiments and may be modified in various ways. Hereinafter, modifications of Exemplary Embodiments 5 to 15 will be described.

<Modification 4>

In Exemplary Embodiments 5 to 15, as an example of the chatbot, the chatbot provides the printing service or email transmission service according to a message from the user. However, the chatbot may provide other arbitrary services. Examples of the services are as follows.

Search service for music, news articles, accommodations, books, cooking recipes, etc.
Ticket reservation service
Service for item selling/search/contact for transaction at a flea market
Service for translation into other languages When the translation service is performed, the system has, for example, the configuration illustrated in FIG. 22. Unlike FIG. 1, instead of the printer A (18A) and the printer B (18B), a translation engine A (19A) and a translation engine B (19B) are provided. The translation engine A is a software robot program for translating Japanese into English, and the translation engine B is a software robot program for translating Japanese into Chinese.

The user A selects the translation engine A. and sets and registers a format in which Japanese to be translated is displayed subsequent to the translation into English, as the setting information. Accordingly, for example, when the user A transmits a message of "今日は空いていますか？" to the chatbot in Japanese which means "Are you free today?" in English, the chatbot drives the translation engine A to automatically respond to the message by transmitting messages "Are you free today?" "今日は空いていますか？."

In this service, when the user transmits the first specific message/specific sticker, the chatbot starts the recording of messages, and when the user transmits the second specific message/specific sticker, the chatbot ends the recording of messages.

In the related art, the chatbot basically performs the service by recognizing the context of messages exchanged between the users and the latest message. However, the chatbot of the related art has neither the function to record the messages themselves between the users, nor the function to print the messages as necessary or transmit the messages to a desired place.

Another aspect of non-limiting embodiments of the present disclosure may relate to providing a technology in which when plural users constitute a group, and messages are exchanged within the group, the messages among the users are stored, and the stored messages are output as necessary.

As another exemplary embodiment of the present disclosure, the following exemplary embodiment may be conceivable.

(1) A message providing device including:
- a storage unit that stores messages from users, as an operation of a software robot program operating on a message service for an exchange of the messages between the users and exchanging messages with a user; and
- a controller that, according to a request from the user, extracts and outputs a message conforming to the request from the messages stored in the storage unit as the operation of the software robot program.

(2) The message providing device according to (1) wherein the request includes an attribute of the message.

(3) The message providing device according to (2) wherein the attribute includes at least one of a transmission source, date, type, or specific character string of the message.

(4) The message providing device according to (1) wherein
the storage unit stores messages from users constituting a specific group, and
when a user outside the specific group makes a request, the controller does not output the message.

(5) The message providing device according to (1) wherein
the storage unit stores messages from users constituting a specific group, and when a user outside the specific group makes a request, the controller outputs the message as long as a certain condition is satisfied.

(6) The message providing device according to (5) wherein the certain condition includes a condition that the user outside the specific group constitutes another group together with any one of the users constituting the specific group.

(7) The message providing device according to (5) wherein the certain condition includes a condition that there is a permission from any one of the users constituting the specific group.

(8) A message providing device including:

a storage unit that stores messages satisfying a certain condition among messages from users, as an operation of a software robot program operating on a message service for an exchange of messages between the users and exchanging messages with a user, and a controller that, according to a request from the user, extracts and outputs the messages stored in the storage unit as the operation of the software robot program.

(9) A message providing device including:

a storage unit that stores messages satisfying a certain condition among messages from users, as an operation of a software robot program operating on a message service for an exchange of messages between the plural users and exchanging messages with a user; and a controller that, according to a request from the user, extracts and outputs a message conforming to the request from the messages stored in the storage unit, as the operation of the software robot program.

(10) The message providing device according to any one of (8) and (9), wherein the storage unit stores messages exchanged for a time period from a transmission of a first specific message or specific sticker from the user until a transmission of a second specific message or specific sticker.

(11) The message providing device according to any one of (8) and (9), wherein the storage unit stores messages exchanged for a time period from a join in the message service until a leaving from the message service.

(12) The message providing device according to any one of (8) and (9), wherein the certain condition includes an attribute of the message.

(13) The message providing device according to (12), wherein the attribute includes at least any of a transmission source, date, type, and a specific character string of the message.

(14) The message providing device according to (11), wherein the storage unit deletes the recorded messages in a case of leaving the message service.

(15) The message providing device according to (11), wherein the storage unit keeps the recorded messages in a case of leaving the message service.

(16) The message providing device according to (11), wherein the storage unit deletes messages which are output according to the request from the user, among the recorded messages in a case of leaving the message service.

(17) A non-transitory computer readable medium storing a program that causes a computer to execute a message providing process, the message providing process including:

storing messages in a storage device from users, as an operation of a software robot program operating on a message service for an exchange of the messages between the users and exchanging messages with a user; and according to a request from the user, extracting and outputting a message conforming to the request from the messages stored in the storage device as the operation of the software robot program.

(18) A non-transitory computer readable medium storing a program that causes a computer to execute a message providing process, the message providing process including:

storing messages satisfying a certain condition among messages from users in a storage device, as an operation of a software robot program operating on a message service for an exchange of messages between the users and exchanging messages with a user; and according to a request from the user, extracting and outputting the messages stored in the storage device as the operation of the software robot program.

(19) A non-transitory computer readable medium storing a program that causes a computer to execute a message providing process, the message providing process including:

storing messages satisfying a certain condition among messages from users in a storage device, as an operation of a software robot program operating on a message service for an exchange of messages between the plural users and exchanging messages with a user; and according to a request from the user, extracting and outputting a message conforming to the request from the messages stored in the storage device, as the operation of the software robot program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A message providing device comprising: a storage unit that stores messages from users, as an operation of a software robot program operating on a message service for an exchange of the messages between the users and exchanging messages with a user; and a controller that, according to a request from the user, extracts and outputs a message conforming to the request from the messages stored in the storage unit as the operation of the software robot program, wherein the storage unit stores messages from users constituting a specific group, and when a user outside the specific group makes a request, the controller outputs the message as long as a certain condition is satisfied, the certain condition comprising a condition that there is a permission from any one of the users constituting the specific group.

2. The message providing device according to claim 1, wherein the request comprises an attribute of the message.

3. The message providing device according to claim 2, wherein the attribute comprises at least one of a transmission source, date, type, or specific character string of the message.

4. A message providing device comprising: a storage unit that stores messages satisfying a first certain condition among messages from users, as an operation of a software robot program operating on a message service for an exchange of messages between the users and exchanging messages with a user; and a controller that, according to a request from the user, extracts and outputs the messages stored in the storage unit as the operation of the software robot program, wherein the storage unit stores messages from users constituting a specific group, and when a user outside the specific group makes a request, the controller outputs the message as long as a second, the second certain condition comprising a condition that there is a permission from any one of the users constituting the specific group.

5. A message providing device comprising: a storage unit that stores messages satisfying a first certain condition among messages from users, as an operation of a software robot program operating on a message service for an exchange of messages between the plural users and exchanging messages with a user; and a controller that, according to a request from the user, extracts and outputs a message conforming to the request from the messages stored in the storage unit, as the operation of the software robot program, wherein the storage unit stores messages from users constituting a specific group, and when a user outside the specific group makes a request, the controller outputs the message as long as a second, the second certain condition comprising a condition that there is a permission from any one of the users constituting the specific group.

6. The message providing device according to claim 4, wherein the storage unit stores messages exchanged for a time period from a transmission of a first specific message or specific sticker from the user until a transmission of a second specific message or specific sticker.

7. The message providing device according to claim 4, wherein the storage unit stores messages exchanged for a time period from a join in the message service until a leaving from the message service.

8. The message providing device according to claim 7, wherein the storage unit deletes the recorded messages in a case of leaving the message service.

9. The message providing device according to claim 7, wherein the storage unit keeps the recorded messages in a case of leaving the message service.

10. The message providing device according to claim 7, wherein the storage unit deletes messages which are output according to the request from the user, among the recorded messages in a case of leaving the message service.

11. The message providing device according to claim 4, wherein the first certain condition comprises an attribute of the message.

12. The message providing device according to claim 11, wherein the attribute comprises at least any of a transmission source, date, type, and a specific character string of the message.

13. A non-transitory computer readable medium storing a program that causes a computer to execute a message providing process, the message providing process comprising: storing messages in a storage device from users, as an operation of a software robot program operating on a message service for an exchange of the messages between the users and exchanging messages with a user; and according to a request from the user, extracting and outputting a message conforming to the request from the messages stored in the storage device as the operation of the software robot program, wherein the storage device stores messages from users constituting a specific group, and when a user outside the specific group makes a request, the message conforming to the request is extracted and output as long as a certain condition is satisfied, the certain condition comprising a condition that there is a permission from any one of the users constituting the specific group.

14. A non-transitory computer readable medium storing a program that causes a computer to execute a message providing process, the message providing process comprising:

storing messages satisfying a first certain condition among messages from users in a storage device, as an operation of a software robot program operating on a message service for an exchange of messages between the users and exchanging messages with a user; and according to a request from the user, extracting and outputting the messages stored in the storage device as the operation of the software robot program, wherein the first certain condition comprises the messages are from users constituting a specific group, and when a user outside the specific group makes a request, the messages are extracted and output as long as a second certain condition is satisfied, the second certain condition comprising a condition that there is a permission from any one of the users constituting the specific group.

15. A non-transitory computer readable medium storing a program that causes a computer to execute a message providing process, the message providing process comprising:

storing messages satisfying a first certain condition among messages from users in a storage device, as an operation of a software robot program operating on a message service for an exchange of messages between the plural users and exchanging messages with a user; and according to a request from the user, extracting and outputting a message conforming to the request from the messages stored in the storage device, as the operation of the software robot program, wherein the first condition comprises the messages are from users constituting a specific group, and when a user outside the specific group makes a request, the message conforming to the request is extracted and output as long as a second certain condition is satisfied, the second certain condition comprising a condition that there is a permission from any one of the users constituting the specific group.

* * * * *